US005535083A

United States Patent [19]

Sako et al.

[11] Patent Number: 5,535,083

[45] Date of Patent: Jul. 9, 1996

[54] MAGNETIC COIL ASSEMBLY WITH SURGE ABSORBER

[75] Inventors: Yuji Sako; Shigeharu Ootsuka, both of Aichi, Japan

[73] Assignee: Mitsubishi Denki Kabushiki Kaisha, Tokyo, Japan

[21] Appl. No.: 10,358

[22] Filed: Jan. 28, 1993

[30] Foreign Application Priority Data

Aug. 27, 1992 [JP] Japan .................................... 4-228547

[51] Int. Cl.$^6$ ....................................................... H02H 7/04

[52] U.S. Cl. ............................................... 361/38; 335/132

[58] Field of Search ............................. 335/132; 361/215, 361/10, 11, 38, 39, 35, 30, 31, 102

[56] References Cited

U.S. PATENT DOCUMENTS

| | | | |
|---|---|---|---|
| 4,075,402 | 2/1978 | Okamoto | 429/98 |
| 4,691,978 | 9/1987 | Lemmer | 439/620 |
| 4,774,484 | 9/1988 | Lehman et al. | 335/197 |
| 4,980,801 | 12/1990 | Guinda et al. | 361/730 |
| 5,206,779 | 4/1993 | Sato et al. | 361/111 |

FOREIGN PATENT DOCUMENTS

| | | |
|---|---|---|
| 0198099A1 | 10/1986 | European Pat. Off. . |
| 61-93955 | 6/1986 | Japan . |
| 64-20649 | 2/1989 | Japan . |
| 64-20650 | 2/1989 | Japan . |
| 394744 | 9/1991 | Japan . |
| 453101 | 2/1992 | Japan . |
| 2211666 | 7/1989 | United Kingdom . |

*Primary Examiner*—A. D. Pellinen
*Assistant Examiner*—Ronald W. Leja
*Attorney, Agent, or Firm*—Sughrue, Mion, Zinn, Macpeak & Seas

[57] ABSTRACT

A magnetic coil assembly with a connector arrangement which prevents explosion or other accident due to the mismatch of voltage rating between a surge absorber and a magnetic coil, allows only the surge absorber to be changed easily if it has been damaged, and ensures ease of automatically assembling the surge absorber into the magnetic coil assembly. The magnetic coil assembly includes a coil spool, a winding wound around the coil spool, and coil terminals mounted on the coil spool and electrically connected with the winding. The surge absorber is connected mechanically and removably with the coil spool or coil terminals, using connectors that may uniquely relate to the ratings of the absorber and coil, and the absorber terminals of the surge absorber are brought into contact with, and therefore are electrically connected with, the coil terminals.

21 Claims, 22 Drawing Sheets

FIG. 18(b)
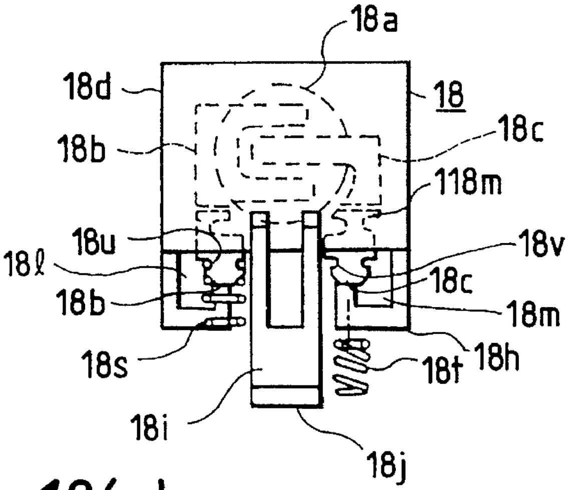
FIG. 18(c)
FIG. 18(a)
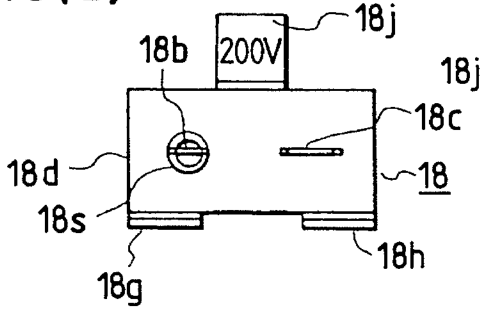
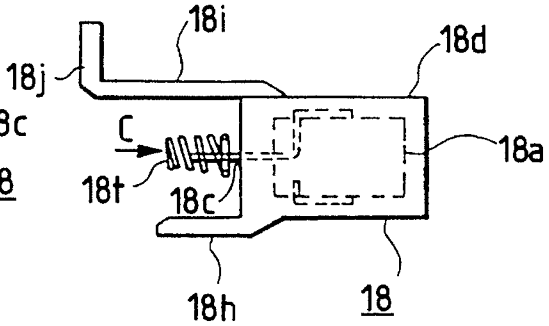
FIG. 18(d)
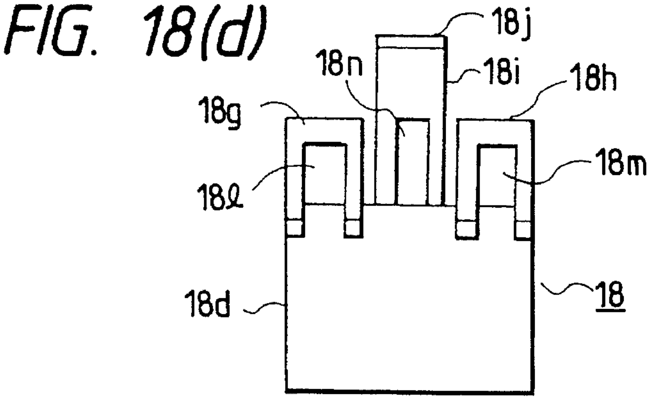

MAGNETIC COIL ASSEMBLY WITH SURGE ABSORBER

BACKGROUND OF THE INVENTION

1. Field of the Invention

The present invention relates to a magnetic coil and electrical equipment such as a magnetic contactor with which such magnetic coil is used, and more specifically to the structure of a surge absorber installed on such magnetic coil and the mounting structure for such surge absorber.

2. Description of the Background Art

FIG. 20 is a front sectional view of electrical equipment (a magnetic contactor in this case) where a magnetic coil concerned with a first conventional design is housed. In FIG. 20, the numeral 1 indicates a mounting base, 2 represents a case, and 3 denotes a magnetic coil. 4 designates a fixed core which is disposed opposite to a movable core 5 with a predetermined gap provided therebetween. 6 indicates a crossbar made of an isolating material and connected to the movable core 5, of which top window *6a* slidably holds a movable contactor 8. The crossbar 6 is slidable guided in FIG. 20 by the case 2 so as to be movable vertically (not shown). 7 indicates a contact spring which uses a compression coil spring and is disposed to provide contact pressure to the movable contactor 8. *8a* and *8b* denote movable contacts mounted at both ends of the movable contactor 8 and disposed opposite to fixed contacts *9a*, *10a*, respectively, with a predetermined gap provided therebetween. 9 and 10 indicate terminal plates having the fixed contacts *9a*, *10a*, respectively, joined on one end and terminal screws 11 threaded on the other end. 12 designates a cover for preventing an arc produced between the contacts from coming out. 13 indicates a trip spring disposed to press the coupled crossbar 6 and movable core 5 upward in FIG. 20.

As shown in a perspective view of FIG. 21, the magnetic coil 3 comprises a resin coil spool 14, a winding 15 wound around said coil spool 14, and a start-of-winding coil terminal 16 and an end-of-winding coil terminal 17 installed on the coil spool 14. The start-of-winding and end-of-winding terminations of the winding 15 are electrically connected to a projection *16b* of the start-of-winding coil terminal 16 and a projection *17b* of the end-of-winding coil terminal 17, respectively. The other end of the start-of-winding coil terminal 16 and the other end of the end-of-winding coil terminal 17 are exposed to the outside of the magnetic contactor (equipment) and are provided with internally threaded holes *16c* and *17c*, respectively, into which terminal screws 11 have been threaded. 30 indicates a covering tape which protects and isolates the winding 15.

In FIG. 20, 18 denotes a surge absorber which, as shown in a perspective view of FIG. 22, consists of a surge absorber body 20 housed in a case 19 and absorber terminals 21, 22 connected electrically to both ends of the surge absorber-body 20 and protruding from the case 19. 23 indicates casting resin which secures the surge absorber body 20 and the absorber terminals 21, 22 to the case 19 and electrically isolates the same from each other. As the surge absorber body 20, a voltage-dependent resistor device, e.g., a varistor, or a capacitor-resistor series circuit, etc., is used. An engagement projection *19a* provided on the case 19 is engaged with an engagement recess la in the mounting base 1 to mechanically fix the surge absorber 18 arranged as described above to the magnetic contactor. Also, the absorber terminals 21, 22 are fastened to the internally threaded hole *16c* in the start-of-winding coil terminal 16 and the internally threaded hole *17c* in the end-of-winding coil terminal 17, respectively, by means of the terminal screws 11 to electrically connect the surge absorber 18 in parallel with the magnetic coil winding 15.

Operation will now be described. When a voltage is applied to the magnetic coil 3, resultant magnetic flux produces absorbing force between the fixed core 4 and the movable core 5. This absorbing force causes the coupled movable core 5 and crossbar 6 to move downward in FIG. 20 against the pressing force of the trip spring 13. This movement brings the movable contacts *8a*, *8b* into contact with the fixed contacts *9a*, *10a*. Since the core gap in the open state of FIG. 20 is designed to be larger than the contact gap, the crossbar 6 further moves downward below the contact making position to provide contact wipe, and the contact spring 7 is compressed and its force is provided to the movable contactor 8, acting as contact pressure. The contact closing operation is thus completed. Now, when the voltage is removed from the magnetic coil 3, the absorbing force between the movable core 5 and the fixed core 4 disappears and the coupled movable core 5 and crossbar 6 are moved upward by the pressing force of the trip spring 13, causing the contacts to open. At this time, an arc produced between the contacts is extended, cooled and extinguished, whereby the contact opening operation is completed.

When the voltage is removed from the magnetic coil 3 in the above operation of the magnetic contactor, a surge having an extremely high voltage value occurs. However, since this surge is absorbed as described above by the surge absorber 20 connected in parallel with the magnetic coil winding 15, it is possible to prevent malfunction induced by a surge voltage in the electronic circuit (not shown) of the other equipment (not shown) connected in parallel with the magnetic coil.

In a second conventional design, as disclosed in Japanese Patent Disclosure Laid-open No. 40823 of 1990, a surge absorber having a surge absorbing device molded by resin is provided outside a control equipment vessel and the absorber terminals of the surge absorber are electrically connected with coil terminals by elastically pressing the whole surge absorber toward the coil terminals without screw tightening.

In a third conventional design, as disclosed in Japanese Utility Model Disclosure Laid-open No. 20650 of 1989, a clip, which wraps up and grips a surge absorbing device that is electrically connected via coil terminations and lead wires, is engaged with a rib provided on the top surface of a coil spool, whereby the surge absorbing device is held on the top surface of the coil spool.

In the first conventional design, the engagement projection provided on the surge absorber case is engaged with the engagement recess of the mounting base to install the surge absorber on the outside of the magnetic contactor and the absorber terminals are fastened to the coil terminals with the screws to electrically connect the absorber terminals and the coil terminals. In such design, the terminal screws must be loosened or removed and the surge absorber must also be removed and reinstalled when the magnetic coil voltage rating of the magnetic contactor is to be changed, i.e., when the magnetic coil is to be replaced by one having a different voltage rating, resulting in troublesome work. In addition, when a voltage-dependent resistor device, such as a varistor, is used as the surge absorber, the device must have device constants (resistance inflection point voltage value, etc.) corresponding to the magnetic coil voltage rating to protect the device from damage, requiring extreme caution in device selection.

In the second conventional design, the absorber terminals of the surge absorber provided with the resin-molded surge absorbing device at the outside of the control equipment vessel are designed to be electrically connected with the coil terminals by elastically pressing the whole surge absorber toward the coil terminals. Hence, when the magnetic coil is to be replaced by one having a different voltage rating, it is not necessary to loosen or remove the terminal screws. As in the first conventional design, however, when a voltage-dependent resistor device, such as a varistor, is employed as the surge absorber, the device must have device constants (resistance inflection point voltage value, etc.) corresponding to the magnetic coil voltage rating to protect the device from damage, requiring extreme caution when the device is selected.

Also, in the second conventional design, the absorber terminals of the surge absorber mounted on the control equipment vessel are designed to be electrically connected with the coil terminals by elastically pressing the absorber terminals toward the coil terminals. Hence, the absorber terminals electrically connected with the coil terminals may be separated therefrom by vibration produced when the movable core 5 comes into contact with, or moves away from, the fixed core 4, offering low reliability.

In the third conventional design, wherein the surge absorber is designed to be integral with the magnetic coil, the disadvantages of the first and second conventional design can be resolved but it is desired to automate the work of assembling the surge absorber into the magnetic coil if the surge absorber is designed to be integral with the magnetic coil. In the third conventional design, however, the surge absorbing device is held on the top surface of the coil spool by engaging the clip for wrapping and gripping the surge absorbing device electrically connected by the coil terminations and lead wires with the rib provided on the top surface of the coil spool. Therefore, automatic assembling of the surge absorber into the magnetic coil could not be done or was very difficult to be done.

Also, in the third conventional design as described above, if the surge absorbing device is damaged, the whole magnetic coil must be changed, or if only the surge absorbing device is changed, the surge absorbing device must first be desoldered and deprived of the lead wires. Then, after the surge absorbing device is changed, the lead wires must be reconnected, resulting in extremely low economy or changing workability.

Further, the third conventional design does not allow the rating, etc., of the built-in surge absorber to be checked from outside of the equipment.

SUMMARY OF THE INVENTION

It is, accordingly, an object of the present invention to overcome the disadvantages in the conventional design by providing a magnetic coil integrated with a surge absorber to prevent any accident resulting in explosive damage due to a mismatch in the voltage rating of the surge absorber and magnetic coil, whereby only the surge absorber can be changed easily and the surge absorber can be assembled into the magnetic coil automatically and easily.

It is another object of the present invention to provide a magnetic coil whose body is integral with a surge absorber to ensure that the rating, etc., of the built-in surge absorber can be checked from the outside of equipment.

The first and second embodiments of the invention each comprise a magnetic coil which prevents any explosive damage accident due to the mismatch of voltage rating between a surge absorber and the magnetic coil, allow only the surge absorber to be changed easily if it has been damaged, and ensure ease of automatically assembling the surge absorber into the magnetic coil. The magnetic coil includes a coil spool, a winding wound around the coil spool, and coil terminals mounted on the coil spool and electrically connected with the winding. The surge absorber is connected mechanically and removably with the coil spool or coil terminals, and the absorber terminals of the surge absorber are brought into contact with, and therefore are electrically connected with, the coil terminals.

Another embodiment comprises a magnetic coil which, in addition to the effects produced by said first and second embodiments, provides extremely excellent electrical connection between coil terminals and absorber terminals, if the dimensional accuracy of a surge absorber is not particularly high, and does not require engagement portions to be provided on the surge absorber. The absorber terminals of the surge absorber including elastic and engagement portions are engaged with the coil terminals, whereby the surge absorber is connected with the coil terminals removably in one direction both mechanically and electrically.

Another embodiment comprises a magnetic coil which, in addition to the effects of the first and second embodiments, does not require holes exclusively used to bring absorber terminals into contact with coil terminals to be provided in a coil spool, leading to the simplification, etc., of the molding die of the coil spool. The coil spool comprises a coil spool body wound with a winding and a coil terminal support having grooves where the coil terminals are inserted and holes linked with the grooves. The coil terminals are provided with engagement portions which are engaged with the holes to lock the coil terminals when the coil terminals are inserted into the grooves of the coil terminal support. In addition, the surge absorber is connected mechanically and removably with the coil spool by elastic engagement portions provided on the surge absorber or coil spool, and the absorber terminals protruding from the surge absorber are inserted into the holes so as to be electrically connected with the coil terminals.

In the first and second embodiments, a surge absorber may be provided, whereby electrical equipment where the magnetic coil and the surge absorber are housed is not increased in size. The surge absorber is connected mechanically and removably with a coil spool or coil terminals so as to be located in a winding space formed by the coil terminals and a winding side portion, i.e., a dead space.

Another embodiment comprises a magnetic coil which, in addition to the above effects, provides extremely excellent electrical connection between coil terminals and absorber terminals if the dimensional accuracy of a surge absorber and a coil spool is not particularly high. The whole surge absorber is elastically pressed toward the coil terminals, thereby bringing the absorber terminals into contact with the coil terminals for electrical connection therebetween.

Another embodiment comprises a magnetic coil which, in addition to the above effects, provides extremely excellent electrical connection between coil terminals and absorber terminals if the dimensional accuracy of a surge absorber and a coil spool is not particularly high. Conductive coil springs or plate springs are fitted to the absorber terminals protruding from the surge absorber or the absorber terminals of the surge absorber are formed by conductive coil springs or plate springs and the coil springs or plate springs are electrically connected with the coil terminals.

Another embodiment comprises a magnetic coil which, in addition to the above effects, provides extremely excellent electrical connection between coil terminals and absorber terminals if the dimensional accuracy of a surge absorber and a coil spool is not particularly high, since the plate springs are split in a dipole form.

Another embodiment comprises a magnetic coil which, in addition to the above effects, allows the presence/absence, rating, etc., of a surge absorber to be checked from the outside of electrical equipment. The surge absorber is provided with an indication portion which is exposed to the outside of an electrical equipment vessel accommodating the magnetic coil.

Another embodiment comprises a magnetic coil which, in addition to the above effects, does not require an indication portion exclusively used for indication to be provided independently of an elastic engagement portion, leading to the simplification, etc., of the molding die of a surge absorber. The indication portion is also used as the engagement portion of the surge absorber.

Another embodiment comprises a magnetic coil which, in addition to the above effects, allows a surge absorber to be thinned. The surge absorber body of the surge absorber is formed by isolation-painting a housing on the joint of absorber terminals to a surge absorbing device and the surge absorber is formed by fitting resin-molded members, such as engagement portions, to the surge absorber body.

Another embodiment comprises a magnetic coil which, in addition to the above effects, allows a surge absorber body and members, such as engagement portions, to be made of separate synthetic resins according to the performance requested and provides an electrically and mechanically excellent surge absorber. The surge absorber body is built by joining absorber terminals to a surge absorbing device, the members are provided on the surge absorber body, and both are formed independently of each other and connected mechanically and removably with each other.

Another embodiment comprises a magnetic coil which, in addition to the above effects, prevents the assembling of a surge absorber which does not match the voltage rating of the magnetic coil. The surge absorber is provided with matching protrusions or matching recesses in positions corresponding to adapted coil rating, and a coil spool is provided with matching recesses or matching protrusions fitted with the matching protrusions or matching recesses of the surge absorber when the surge absorber is mechanically connected.

Another embodiment comprises a magnetic coil which, in addition to the above effects, eliminates the requirement of preparing a plurality of different coil spools having matching protrusions or matching recesses for each coil rating. The coil spool of the magnetic coil is provided with movable matching protrusions or matching recesses.

Another embodiment comprises a magnetic coil which, in addition to the above effects, eliminates the requirement of preparing a plurality of different coil spools having matching protrusions or matching recesses for each coil rating. The coil spool of the magnetic coil is provided with a plurality of matching protrusions or or matching recesses corresponding to a plurality of magnetic coil ratings, and those other than the matching protrusion or matching recess corresponding to the rating of a coil wound around the coil spool are filled in or deleted.

Another embodiment comprises a magnetic coil which, in addition to the above effects, hinders a surge absorber from moving inward and prevents electrical equipment from failing due to the inward movement of the surge absorber. In the electrical equipment which uses the magnetic coil housed in a vessel, a rib for preventing the surge absorber from moving toward a winding is provided on the vessel.

Another embodiment comprises a magnetic coil which, in addition to the above effects, allows a surge absorber to be mechanically and electrically connected with coil terminals or a coil spool after the magnetic coil is housed in an electrical equipment vessel, and also allows the surge absorber to be changed without the magnetic coil being removed from the vessel if the surge absorber is damaged during use of electrical equipment. A hole where the surge absorber can be inserted is provided in the wall surface of the vessel in a direction in which the surge absorber is mechanically connected with the coil terminals or coil spool.

BRIEF DESCRIPTION OF THE DRAWINGS

FIG. 6(*a*) is a front view, FIG. 6(*b*) is a plan view, FIG. 6(*c*) is a side view, and FIG. 6(*d*) is a rear view.

FIG. 10(*a*) is a perspective view of a surge absorber and FIG. 10(*b*) is a sectional view illustrating the status of such surge absorber installed on coil terminals.

FIG. 11(*a*) is a perspective view of a surge absorber, FIG. 11(*b*) is a sectional view illustrating the status of the surge absorber installed on coil terminals, and FIG. 11(*c*) is a perspective view illustrating a modification of the absorber terminals of the surge absorber.

FIG. 12(*a*) is a perspective view of a surge absorber, FIG. 12(*b*) is a sectional view illustrating the status of the surge absorber installed on coil terminals, and FIG. 12(*c*) is a perspective view illustrating a modification of the absorber terminals of said surge absorber.

FIG. 14(*a*) is a perspective view of a surge absorber, FIG. 14(*b*) is a sectional view illustrating the status of the surge absorber installed on coil terminals, and FIG. 14(*c*) is a perspective view illustrating a modification of the absorber terminals of the surge absorber.

FIG. 16(*a*) is a perspective view illustrating a surge absorber in the process of manufacturing, FIG. 16(*b*) is a front view of a surge absorber body of the surge absorber, and FIG. 16(*c*) is a side view of the surge absorber body of the surge absorber.

FIGS. 18(*a*)–18(*d*) illustrate the arrangement of a surge absorber concerned with a thirteenth preferred embodiment of the present invention; FIG. 18(*a*) is a front view, FIG. 18(*b*) is a plan view, FIG. 18(*c*) is a side view, and FIG. 18(*d*) is a rear view.

DESCRIPTION OF THE PREFERRED EMBODIMENTS

Figure 1:
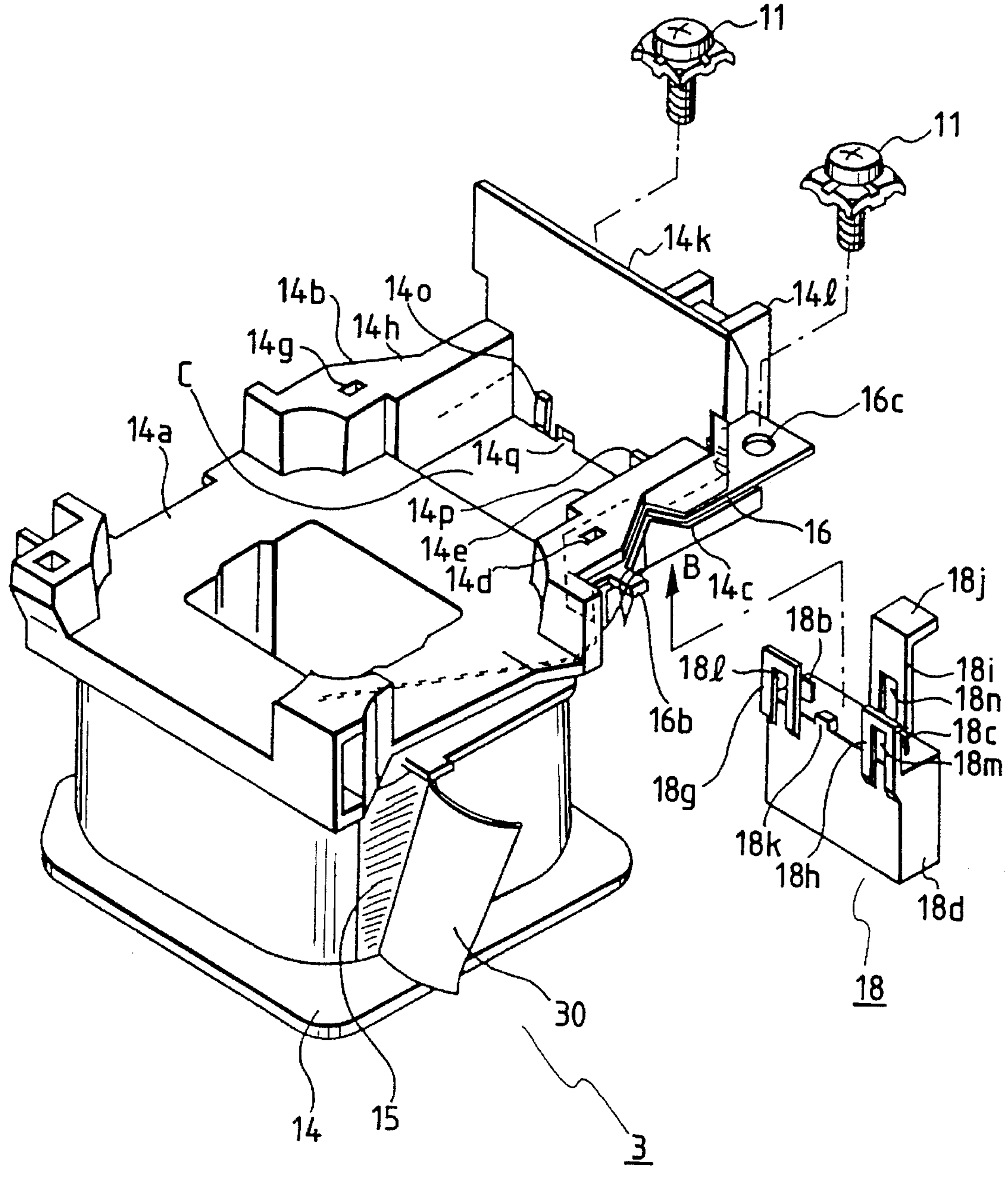
FIG. 1 is a perspective view of a magnetic coil and a surge absorber concerned with a first preferred embodiment of the present invention.
Figure 2:
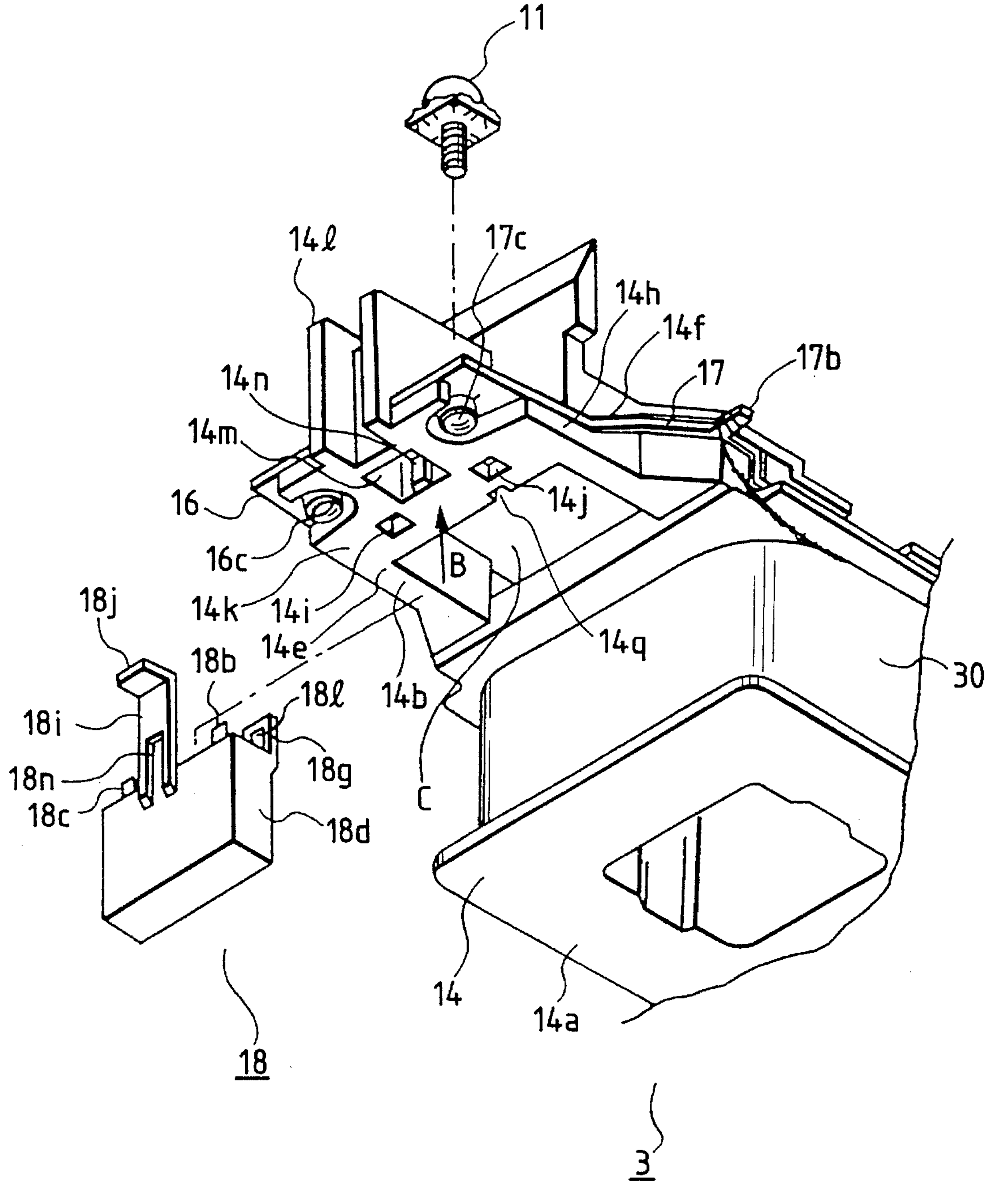
FIG. 2 is a perspective view of the magnetic coil and surge absorber concerned with the first preferred embodiment of the present invention, and is a perspective view seen from the back side of FIG. 1.
Figure 3:
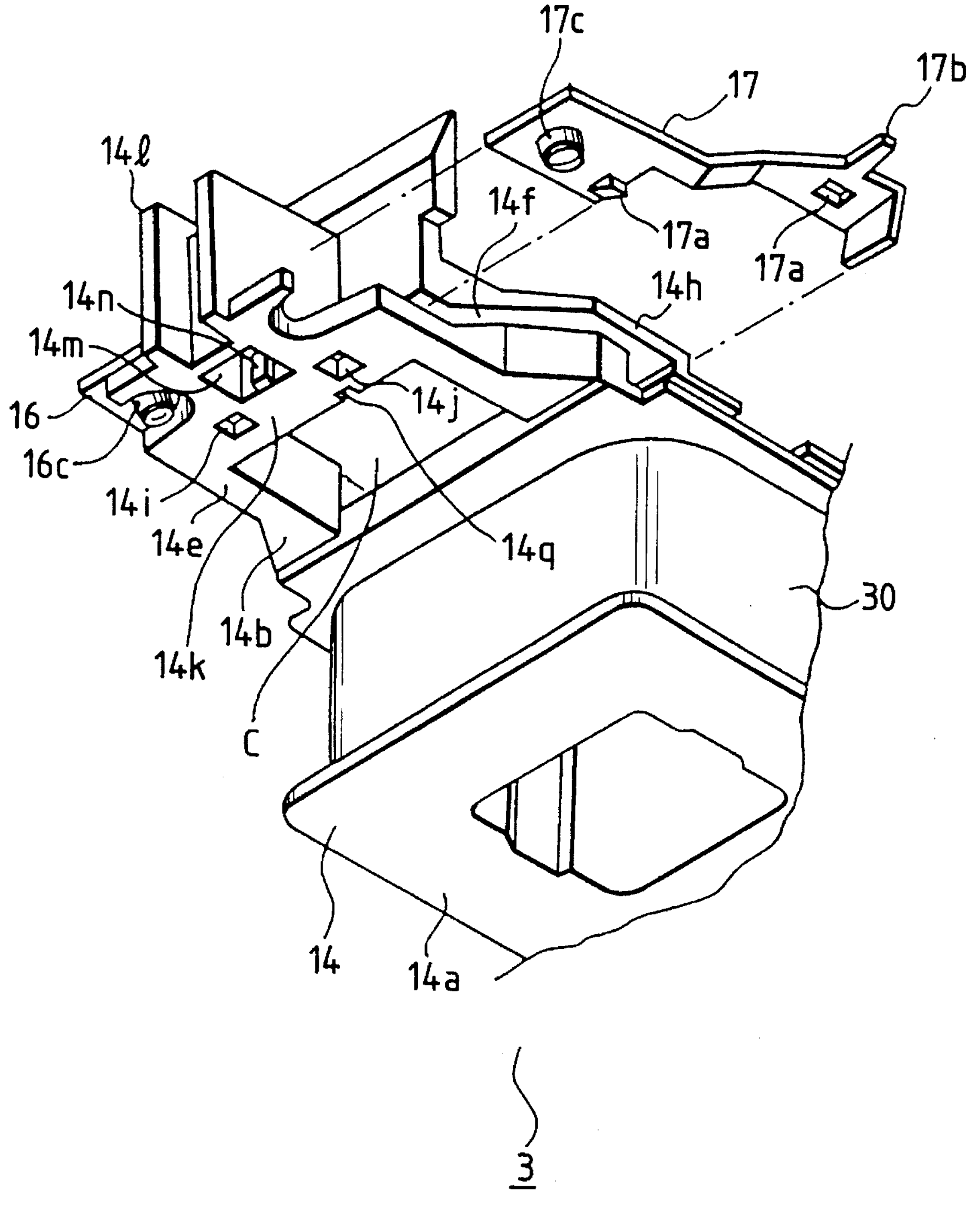
FIG. 3 is a perspective view concerned with the first preferred embodiment of the present invention, illustrating that an end-of-winding terminal is being assembled into a coil spool.
Figure 4:
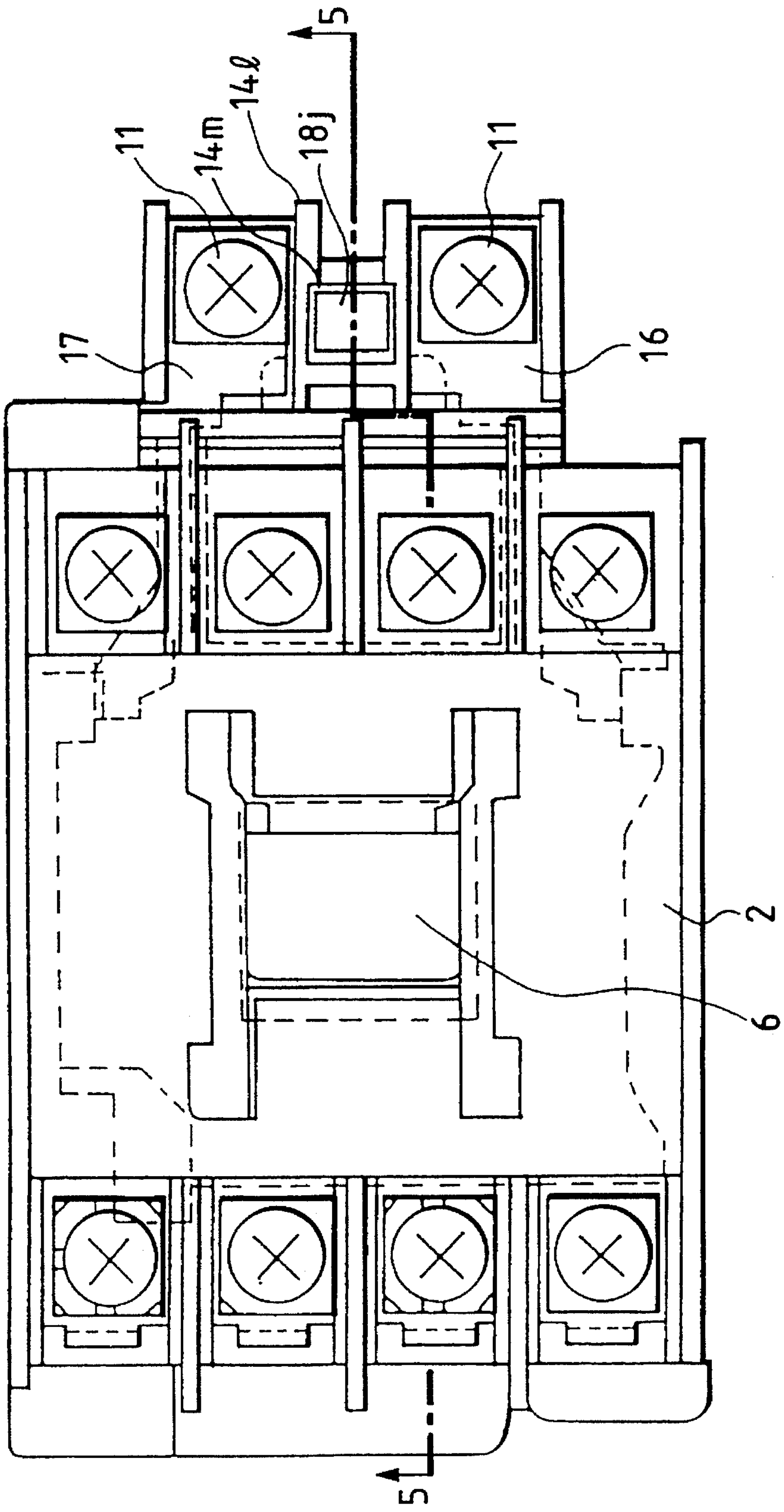
FIG. 4 is a top view of a magnetic contactor in which the magnetic coil and surge absorber concerned with the first preferred embodiment of the present invention are contained.
Figure 5:
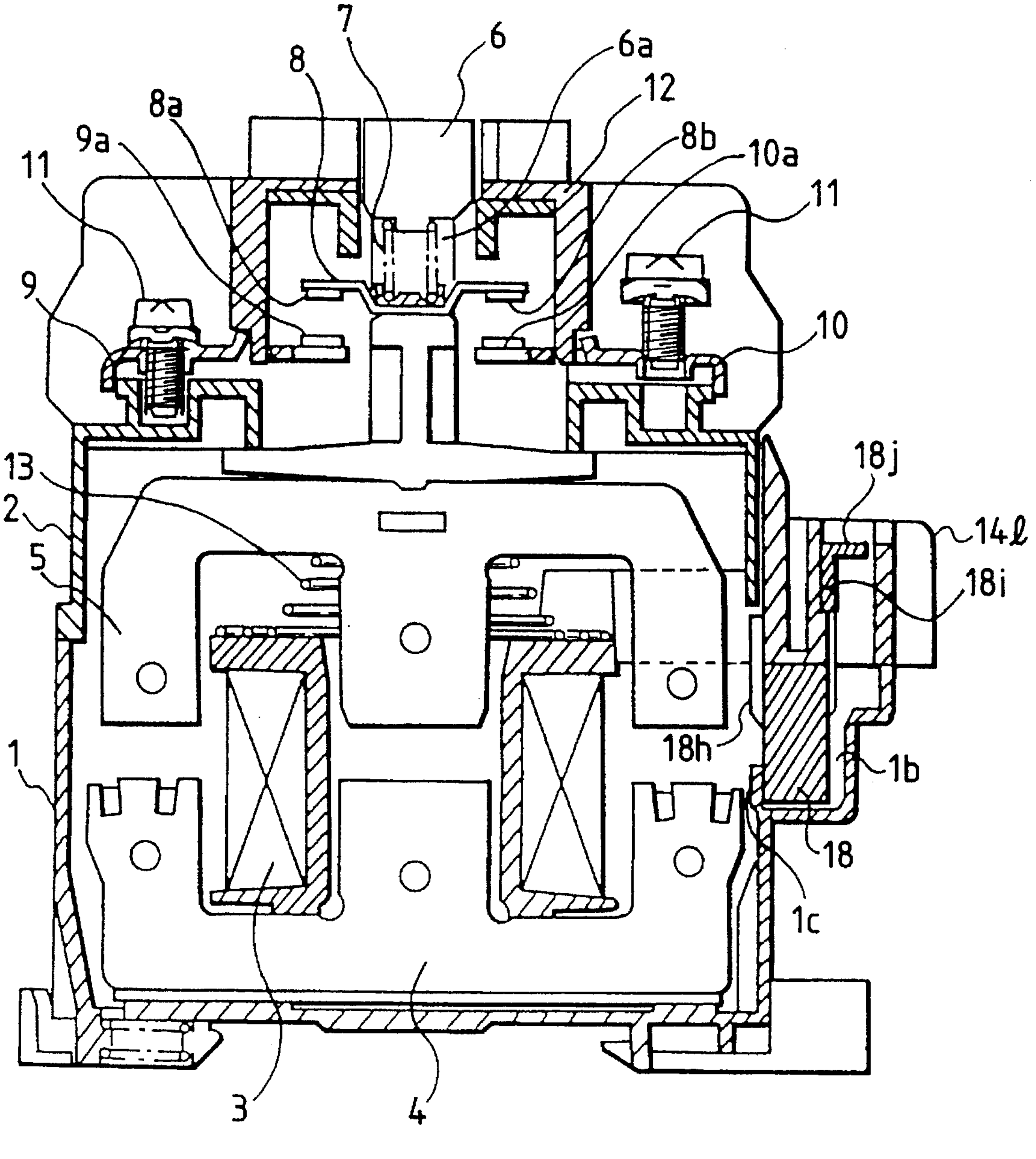
FIG. 5 is a sectional view taken along the plane 5—5 of FIG. 4.
Figure 6B:
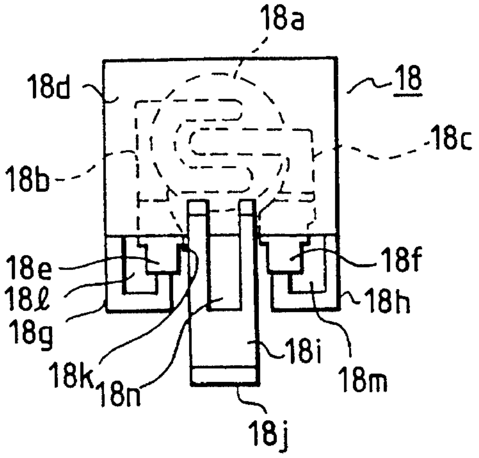
FIGS. 6(*a*)–6(*d*) illustrate the arrangement of the surge absorber concerned with the first preferred embodiment of the present invention.
Figure 6C:
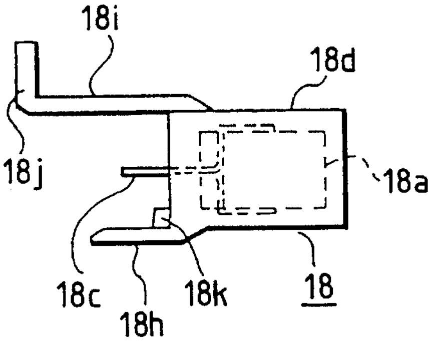
Figure 6A:
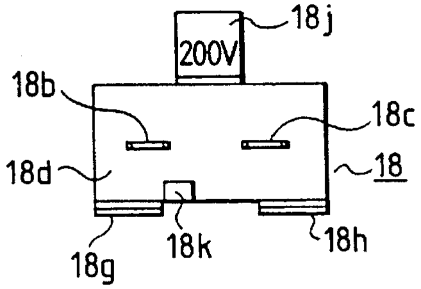
Figure 6D:
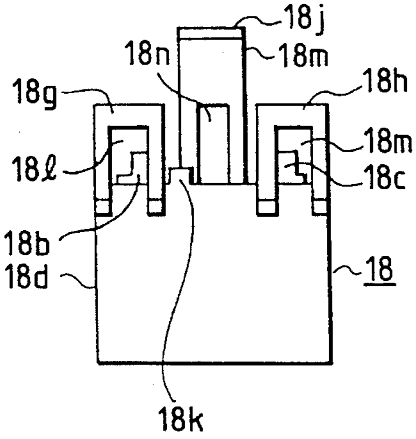

A first embodiment of the present invention will now be described in accordance with FIGS. 1 to 6. FIG. 1 is a perspective view of a magnetic coil and a surge absorber. FIG. 2 is a perspective view of the magnetic coil and surge absorber as viewed from the back side of FIG. 1. FIG. 3 is a perspective view illustrating that coil terminals are being assembled into a coil spool. FIG. 4 is a top view of electrical equipment (magnetic contactor in the present embodiment) in which the magnetic coil and surge absorber are contained. FIG. 5 is a sectional view taken along the plane 5—5 of FIG. 4, i.e., a front sectional view, and FIGS. 6(*a*)–6(*d*) are a surge absorber arrangement diagrams.

Referring now to FIGS. 4 and 5, the numeral 1 indicates a mounting base, 2 indicates a case, and 3 denotes a magnetic coil. 4 designates a fixed core which is disposed opposite to a movable core 5 with a predetermined gap provided therebetween. 6 represents a crossbar made of an isolating material and connected to said movable core 5, of which top window 6a slidable holds a movable contactor 8. The crossbar 6 is slidable guided by said case 2 so as to be movable vertically (not shown) in FIG. 5. 7 denotes a contact spring which uses a compression coil spring and is disposed to provide contact pressure to the movable contactor 8, 8*a* and 8*b* indicate movable contacts mounted at both ends of the movable contactor 8 and disposed opposite to fixed contacts 9*a*, 10*a*, respectively, with a predetermined gap provided therebetween. 9 and 10 indicate terminal plates having the fixed contacts 9*a*, 10*a*, respectively, joined on one end and terminal screws 11 threaded on the other end. 12 shows a cover for preventing an arc produced between the contacts from coming out. 13 indicates a trip spring disposed to press the coupled crossbar 6 and movable core 5 upward in FIG. 5.

As shown in the perspective views of FIGS. 1 to 3, the magnetic coil 3 comprises a resin coil spool 14 having a coil spool body 14*a* and a coil terminal support 14*b*, a winding 15 wound around the coil spool body 14a, a start-of-winding coil terminal 16 mounted on the coil spool 14 to extend in a direction perpendicular to the winding axis of the coil spool body 14*a* and electrically connected with the winding start of said winding 15, and an end-of-winding coil terminal 17 mounted on the coil spool 14 to extend in a substantially identical direction to and substantially in parallel with the extending direction of the start-of-winding coil terminal 16 and electrically connected with the winding end of the winding 15.

The coil terminal support 14*b* of the coil spool 14 has a groove 14*c* where the start-of-winding coil terminal 16 is inserted and an engagement hole 14*d* linked with the groove 14*c*. Support 14*b* also has a first pillar portion 14*e* molded integrally with the coil spool body 14*a* to extend in a direction perpendicular to the winding axis of said coil spool body 14*a*. There also is a groove 14*f* where the end-of-winding coil terminal 17 is inserted, and an engagement hole 14*g* linked with the groove 14*f*. The support 14*b* has a second pillar portion 14*h* molded integrally with the coil spool body 14*a* to extend in an identical direction to and substantially in parallel with the first pillar portion 14*e*. Pillar portion 14h has grooves 14*f* which are similar to and linked with the grooves 14*c*. The corresponding coil terminals 16, 17 are inserted into grooves 14*c* and 14*f*, and engagement holes 14*i* and 14*j* are linked with those grooves. The support is provided with a connection portion 14*k* molded integrally to connect the front ends of the first and second pillar portions 14*e*, 14*h* and a barrier 14*l* molded integrally with the connection portion 14*k*. In this design, space C where the movable core 5 can be fitted is formed, and the barrier 14*l* serves to isolate the front ends of the coil terminals 16, 17.

The connection portion 14*k* of the coil terminal support 14*b* has an indication window 14*m* in which an engagement portion 18*i* also serving as the indicating portion of a surge absorber 18 (described later), an engagement projection 14*n* formed on the side wall of the indication window 14*m*, two engagement projections 14*o* and 14*p* formed on a side wall (winding-end side wall of the connection portion) opposite to said engagement projection 14*n* with a wall in between, and a notch 14*q* formed in a position corresponding to the coil rating of the winding 15.

The end-of-winding terminal 17, as shown in FIG. 3, includes two projections 17*a* formed to protrude in directions opposite to each other, a projection portion 17*b* electrically connected with the end-of-winding terminations of the winding 15, and an internally threaded hole 17*c* which is formed at the front end and into which the terminal screw 11 is threaded. In a similar arrangement to the end-of-winding coil terminal 17, the start-of-winding terminal 16 includes two projections formed to protrude in directions opposite to each or her, a projection portion 16*b* electrically connected with the start-of-winding terminations of the winding 15, and an internally threaded hole 16*c* which is formed at the front end and into which the terminal screw 11 is threaded.

When the end-of-winding coil terminal 17 is inserted into the groove 14*f* of the coil terminal support 14*b*, the projections 17*a* are engaged with and locked by the engagement holes 14*g*, 14*j* of the coil terminal support 14*b*. At this time, the internally threaded hole 17*c* is exposed from the second pillar portion 14*h* of the coil terminal support 14*b*. Also, in a similar manner, when the start-of-winding coil terminal 16 is inserted into the groove 14*c* of the coil terminal support 14*b*, the two projections formed to protrude in the opposite directions to each other are engaged with and locked by the engagement holes 14*d*, 14*i* of the coil terminal support 14*b*. At this time, the internally threaded hole 16*c* is exposed from the first pillar portion 14*e* of the coil terminal support 14*b*. The front ends of the coil terminals 16, 17 are isolated by the barrier 14*l* of the coil terminal support 14*b*, and the start-of-winding and end-of-winding terminations of the winding 15 are electrically connected with the projection portions 16*b*, 17*b*, respectively. 30 indicates a covering tape which protects and isolates the winding 15.

18 indicates a surge absorber wherein, as detailed in FIGS. 6(*a*)–6(*d*), a surge absorber body is made up by electrically joining absorber terminals 18*b*, 18*c* to a surge absorbing device 18*a* consisting of a voltage-dependent resistor device, such as a varistor, or a capacitor-resistor series circuit. This surge absorber body has a housing which is formed by molded resin 18*d*, e.g., phenol or polybutylene terephthalate having high mechanical strength and excellent heat resistance. Front ends 18*e*, 18*f* of the absorber terminals 18*b*, 18*c* protrude from the molded resin 18*d*, and the absorber terminals 18*b*, 18*c* are fixed in position to secure mutual isolation. The molded resin 18*d* also has elastic engagement portions 18*g*, 18*h* and 18*i*, an indication portion 18*j* integrated with the elastic engagement portion 18*i*, and a projection 18*k* located at a portion fitted with the notch 14*q* of the coil terminal support 14*b*. All of these may be molded simultaneously. Engagement windows 18*l*, 18*m* and 18*n* formed within the elastic engagement portions 18*g*, 18*h*, 18*i* are engaged with the engagement projections 14*n*, 14*o*, 14*p* of the coil terminal support 14*b*. They operate to mechanically connect the surge absorber 18 with the coil spool 14. On the indication portion 18*j*, the specifications of the voltage rating of the surge absorber 20 are indicated with characters or in color.

The surge absorber 18 is assembled into the magnetic coil 3 before the magnetic coil 3 is housed in the mounting base 1. This assembling is generally done by an automatic assembling machine, not shown. In this regard, the surge absorber 18 is pushed in one direction, i.e., in the direction of arrow B, against the elastic force of the elastic engagement portions 18*g*, 18*h*, 18*i*, whereby the engagement windows 18*l*, 18*m*, 18*n* formed inside the elastic engagement portions 18*g*, 18*h*, 18*i* are engaged with the engagement projections 14*n*, 14*o*, 14*p* of the coil spool 14, respectively. Also, the projection 18*k* is fitted into the notch 14*q* of the coil terminal support 14*b*. At this time, the front ends 18*e*, 18*f* of the absorber 18*b*, 18*c* come into contact with the corresponding coil terminals 16, 17 through the engagement holes 14*i*, 14*g* of the coil spool 14, thereby connecting the absorber terminals 18*b*, 18*c* and the corresponding coil terminals electrically.

During this assembly operation, if it is attempted to assemble a surge absorber 18 which does not match the voltage rating of the magnetic coil 3, the projection 18*k* formed on the surge absorber 18 in a location fitted with the notch 14*q* of the coil terminal support 14*b* does not fit into the notch 14*q* of the coil terminal support 14*b* and the engagement windows 18*l*, 18*m*, 18*n* formed inside the elastic engagement portions 18*g*, 18*h*, 18*i* cannot engage with the engagement projections 14*n*, 14*o*, 14*p* of the coil spool 14. This prevents a surge absorber 18 which does not match the voltage rating of the magnetic coil 3 from being assembled.

In the magnetic coil 3 integrated with the surge absorber 18 as described above and housed in the mounting base 1 as shown in FIG. 5, when this housing work is done, the connection portion 14*k* of the coil spool 14 is exposed to the outside of the mounting base 1. Also, the magnetic coil 3 is housed so that the surge absorber 18 is located at a recess 1*b* made by a rib 1*c* formed in the mounting base 1 and the wall surface of the mounting base 1. At this time, since the connection portion 14*k* of the coil spool 14 is exposed to the outside of the mounting base 1, the indication portion 18*j* inserted in the indication window 14*m* of the coil spool 14 is viewed through the indication window 14*m* of the coil spool 14 from outside of the magnetic contactor (electrical equipment). In this manner, whether the surge absorber 18 exists or not can be checked according to the presence or absence of the indication portion 18*j* from the outside of the magnetic contactor (electrical equipment). In addition, the specifications of the voltage rating of the surge absorber 18 are indicated with characters or in color on the top surface of the indication portion 18*j*, whereby the rating of the surge absorber 18 can be checked from the outside of the electrical equipment.

Since the magnetic coil 3 is housed so that the surge absorber 18 is located at the recess l*b* made by the rib 1*c* formed in the mounting base 1 and the wall surface of the mounting base 1, the rib 1*c* prevents the surge absorber 18 from moving toward the movable core 5. Also, the indication window 14*m* formed in the coil spool 14 so that the indication portion 18*j* inserted in the indication window 14*m* of the coil spool 14 is seen from the outside of the magnetic contactor (electrical equipment) may have a possibility that foreign matter may come in therefrom. However, the indication portion 18*j* hinders large foreign matter from coming in and the rib 1*c* hinders small foreign matter from coming in.

In the design wherein the absorber terminals 18*b*, 18*c* are brought into contact with the coil terminals 16, 17 to provide electrical connection therebetween so as to automate the assembling of the surge absorber 18 into the magnetic coil 3, the surge absorber 18 mechanically connected with the coil spool 14. Using the elastic engagement portions 18*g*, 18*h*, 18*i* and the engagement projections 14*n*, 14*o*, 14*p* eliminates the possibility of electrical disconnection of the absorber terminals 18*b*, 18*c* from the coil terminals 16, 17 due to vibration generated when the movable core 5 is connected to or disconnected from the fixed core 4.

If the surge absorber 18, which is mechanically connected with the coil spool 14 using the elastic engagement portions 18*g*, 18*h*, 18*i*, is damaged during use, the surge absorber 18 can be changed by merely transforming and disengaging the elastic engagement portions 18*g*, 18*h*, 18*i* from the engagement projections 14*n*, 14*o*, 14*p* of the coil spool 14, offering high workability to the replacement of the surge absorber 18.

The engagement holes 14*i*, 14*j* for securing the coil terminals 16, 17 to the coil spool 14 are employed to bring the absorber terminals 18*b*, 18*c* into contact with the coil terminals 16, 17. Specifically, the absorber terminals 18*b*, 18*c* are inserted into the engagement holes 14*i*, 14*j* so as to be brought into contact with the coil terminals 16, 17. Accordingly, holes exclusively used to bring the absorber terminals 18*b*, 18*c* into contact with the coil terminals 16, 17 need not be provided in the coil spool 14. This leads to the simplification, etc., of the molding die of the coil spool 14.

Also, a dead space, i.e., the space produced by the coil terminals 16, 17 and the winding 15 side portion, is used as a position where the surge absorber 18 is disposed on the magnetic coil 3. Hence, the provision of the surge absorber 18 on the magnetic coil 3 does not enlarge the electrical equipment accommodating these components.

Further, the indication portion 18*j* of the surge absorber 18, which is disposed on the elastic engagement portion 18*i* for connecting the surge absorber 18 mechanically and removably with the magnetic coil 3, does not require an indication portion exclusively used for providing an indication separately from the elastic engagement portion 18*i*. This leads to the simplification, etc., of the molding die of the surge absorber 18.

Figure 7:
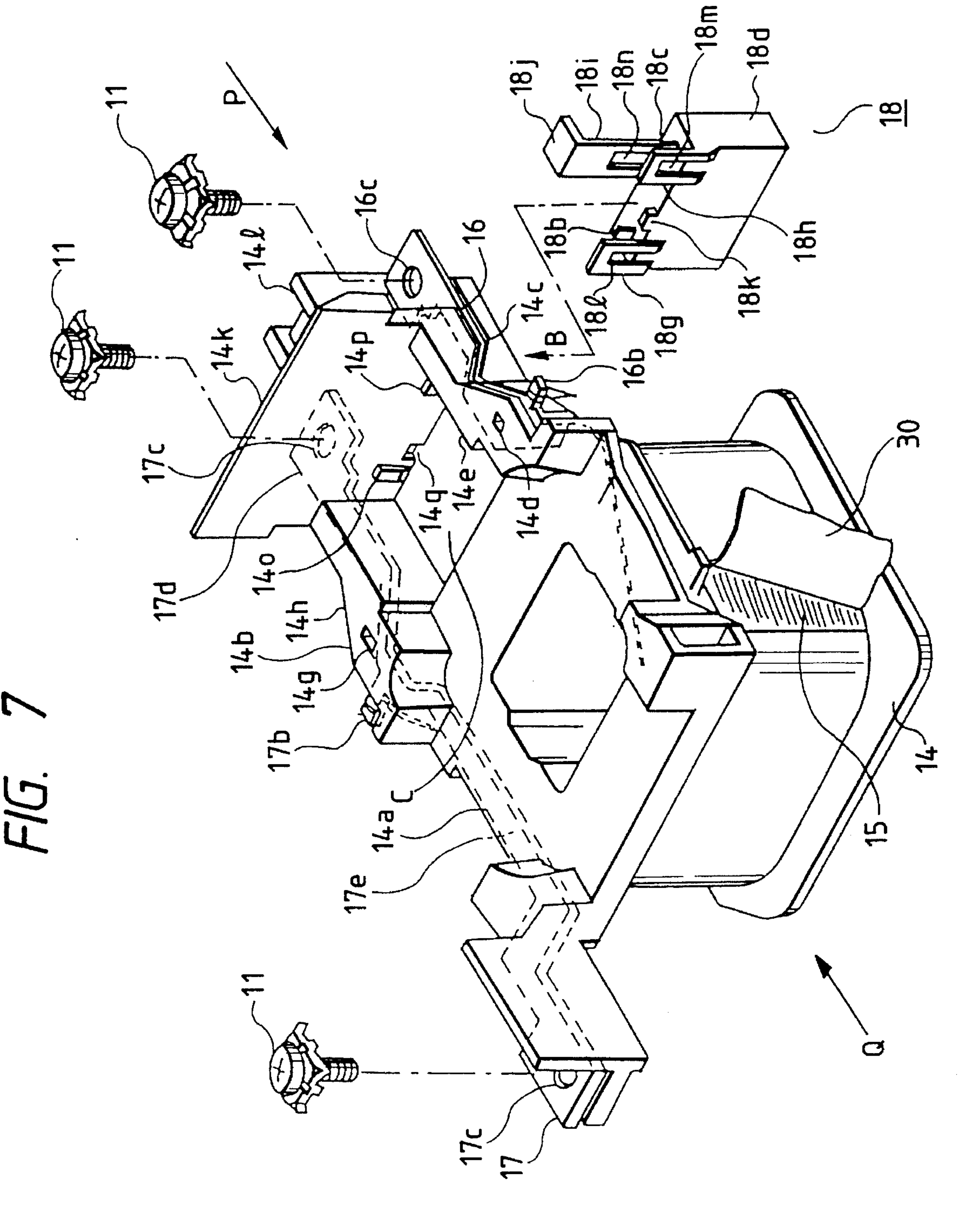
FIG. 7 is a perspective view of a magnetic coil and a surge absorber concerned with a second preferred embodiment of the present invention.

A second embodiment of the present invention will now be described in accordance with FIG. 7, which shows an example wherein coil terminals are arranged to respond to either of a case where there are three coil terminals, i.e., two wires connected to a winding 15 are routed from the power supply side (arrow P) of the magnetic contactor, and a case where one wire comes from each of the power supply side and the load side (arrow Q).

An end-of-winding coil terminal 17 has a total of two wire connection portions, i.e., a first wire connection portion 17*d* on the side of arrow P and a second wire connection portion 17*e* continuing from the first wire connection portion 17*d* on the opposite side (side of arrow Q), is provided with internally threaded holes 17*c* into which terminal screws 11 are threaded at the front ends of said connection portions, and is also provided with a projection portion 17*b* electrically connected with the end-of-winding termination of the winding 15 in the central position. Also, the second wire connection portion 17*e* of the end-of-winding coil terminal 17 is inserted and held in a groove formed in a coil spool body 14*a*. The other parts are essentially identical to those of the first embodiment and therefore will not be described.

This second embodiment produces identical effects as in the first embodiment.

Figure 8:
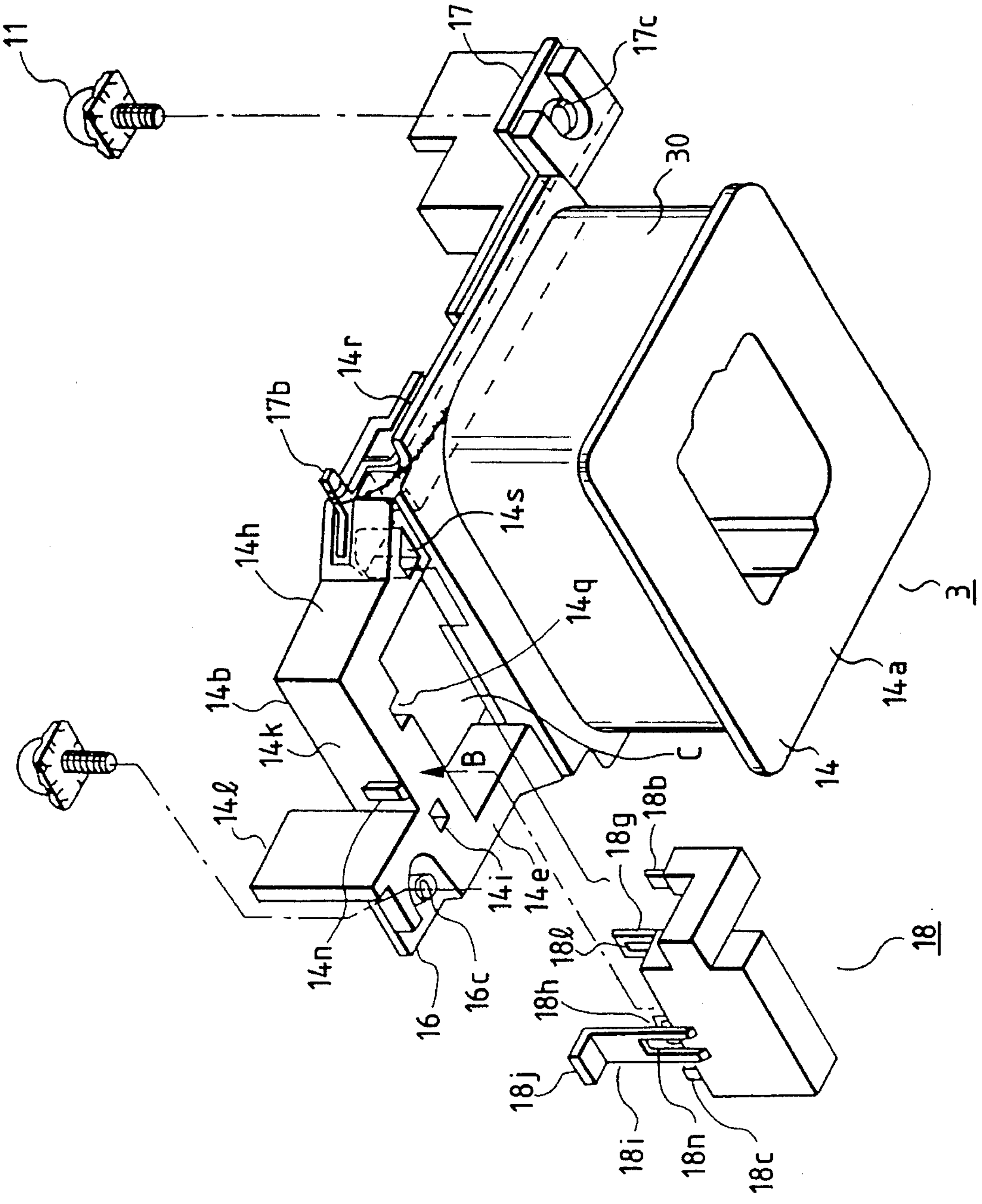
FIG. 8 is a perspective view of a magnetic coil and a surge absorber concerned with a third preferred embodiment of the present invention.

A third embodiment of the present invention will now be described in accordance with FIG. 8, which shows an example wherein coil terminals are arranged at two points on a diagonal line. An end-of-winding coil terminal 17 is opposed to a start-of-winding coil terminal 16 on the diagonal line. As in the end-of-winding coil terminal 17 of the first embodiment, the end-of-winding coil terminal 17 of the present embodiment has two projections (not shown) formed to protrude in directions opposite to each other. These include a projection portion 17*b* with which the end-of-winding termination of a winding 15 is electrically connected, and an internally threaded hole 17*c* into which a terminal screw 11 is threaded. When this end-of-winding coil terminal 17 is inserted into a groove 14*r* formed in a coil spool body 14*a*, one of said projections is engaged with an engagement hole 14*s* formed in a coil spool 14 and the other projection is engaged with and locked by an engagement hole formed in the coil spool 14. At this time, the internally threaded hole 17*c* is exposed from the coil spool 14 and the end-of-winding termination of the winding 15 is electrically connected with the projection portion 17*b*.

In the meantime, the surge absorber 18 is provided with an absorber terminal 18*b* in a position different from the absorber terminal 18*b* in the first embodiment, i.e., in a position where it can be inserted into the engagement hole 14*s* formed in the coil spool 14 and make electrical contact with the end-of-winding coil terminal 17. The other parts are essentially identical to those of the first embodiment and therefore will not be described.

This third embodiment produces identical effects as in the first embodiment.

Figure 9:
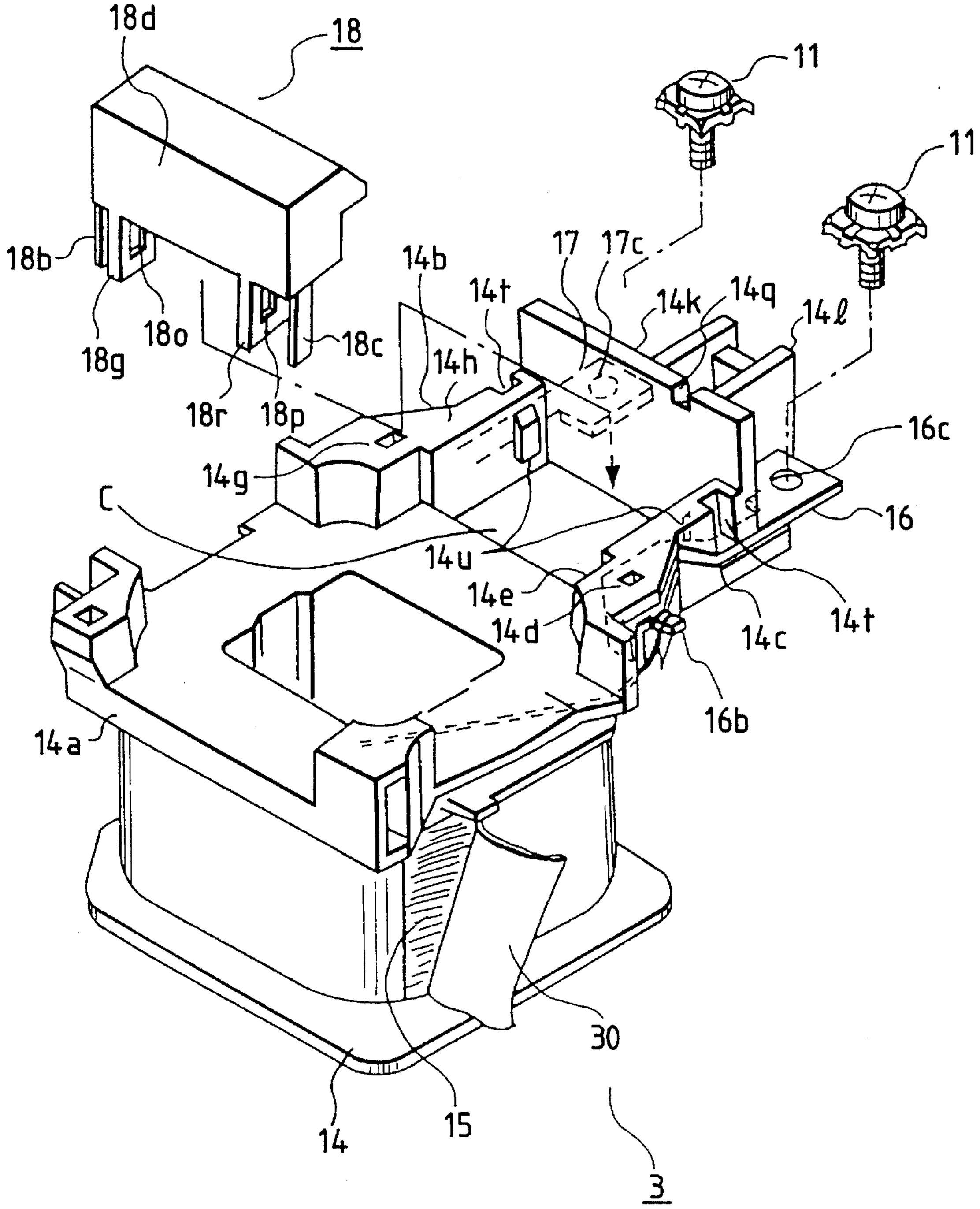
FIG. 9 is a perspective view of a magnetic coil and a surge absorber concerned with a fourth preferred embodiment of the present invention.

A fourth embodiment of the present invention will now be described in accordance with FIG. 9, which shows an example wherein a surge absorber 18 is disposed on the top of a coil terminal support 14*b*.

First and second pillar portions 14*e*, 14*h* of the coil terminal support 14*b* are respectively provided with grooves 14*t* linked to corresponding coil terminals 16, 17 and also respectively provided with engagement projections 14*u* in mutually opposite positions on the inner wall. A notch 14*q* formed in a position corresponding to the coil rating of a winding 15 is formed in the top surface of a connection portion 14*k* of the coil terminal support 14*b*.

In the meantime, the surge absorber 18 is provided with elastic engagement portions 18*q*, 18*r* having windows 18*o*, 18*p* elastically engaged with the engagement projections 14*u* of the coil terminal support 14*b*, with absorber terminals 18*b*, 18*c* which are inserted into the grooves 14*t* of the coil terminal support 14*b* and whose front ends make contact with and are electrically connected with the corresponding coil terminals 16, 17, and with a projection (not shown) fitted into the notch 14*q* of the coil terminal support 14*b*. When the elastic engagement portions 18*q*, 18*r* are elastically engaged with the engagement projections 14*u* of the coil terminal support 14*b*, said surge absorber 18 is mechanically connected with the coil terminal support 14*b*, the-absorber terminals 18*b*, 18*c* are inserted into the grooves 14*t* of the coil terminal support 14*b*, their front ends make contact with and are electrically connected with the corresponding coil terminals 16, 17, and said projection is fitted into the notch 14*q* of the coil terminal support 14*b*. The other parts are essentially identical to those of the first embodiment and therefore will not be described.

Though inferior to the first embodiment in the effective utilization of the dead space of the magnetic coil 3, this fourth embodiment produces similar effects as in the first embodiment.

A fifth embodiment of the present invention will now be described in accordance with FIGS. 10(*a*) and 10(*b*). As shown, recesses 18*u*, 18*v* into which conductive coil springs 18*s*, 18*t* are fitted and formed at the roots of portions protruding from molded resin 18*d* of absorber terminals 18*b*, 18*c*. The coil springs 18*s*, 18*t* are fitted into the recesses 18*u*, 18*v* of said absorber terminals 18*b*, 18*c* so as not to be removed from the absorber terminals 18*b*, 18*c* and are electrically connected with the absorber terminals 18*b*, 18*c*.

Figure 10A:
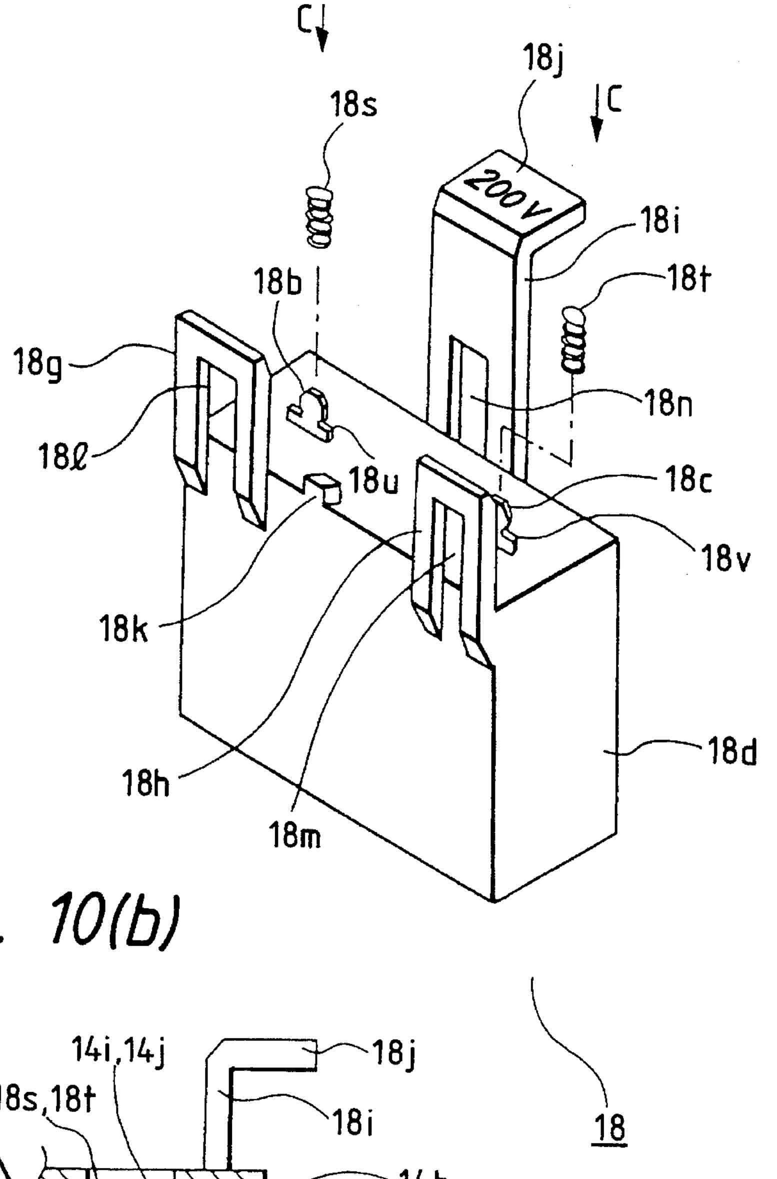
FIGS. 10(*a*) and 10(*b*) are concerned with a fifth preferred embodiment of the present invention.
Figure 10B:
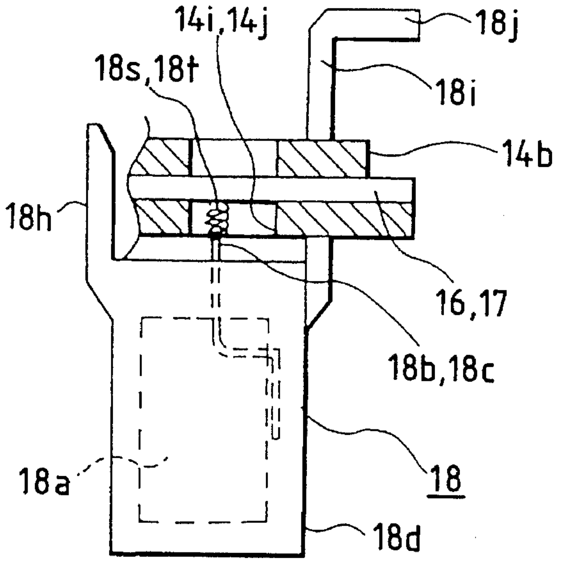

As shown in FIG. 10(*b*), when a surge absorber 18 is connected with a coil spool 14, said coil springs 18*s*, 18*t* make contact with a start-of-winding coil terminal 16 and an end-of-winding coil terminal 17 through engagement holes 14*i*, 14*j* in said coil spool 14 and are electrically connected in parallel with a magnetic coil winding 15. At this time, the coil springs 18*s*, 18*t* transform elastically in the direction of arrow C in FIG. 10(*a*) and the spring pressure serves as the pressure for contact with the start-of-winding coil terminal 16 and end-of-winding coil terminal 17. The other parts are essentially identical to those of the first embodiment and therefore will not be described.

In the above design, the electrical connection of the coil terminals 16, 17 and corresponding absorber terminals 18*b*, 18*c* is extremely excellent if the dimensional accuracy of the surge absorber 18 and coil spool 14 is not particularly high.

The coil springs 18*s*, 18*t* may be replaced by plate springs which have been fixed to the absorber terminals 18*b*, 18*c* by, for example, welding to have identical effects.

Figure 11A:
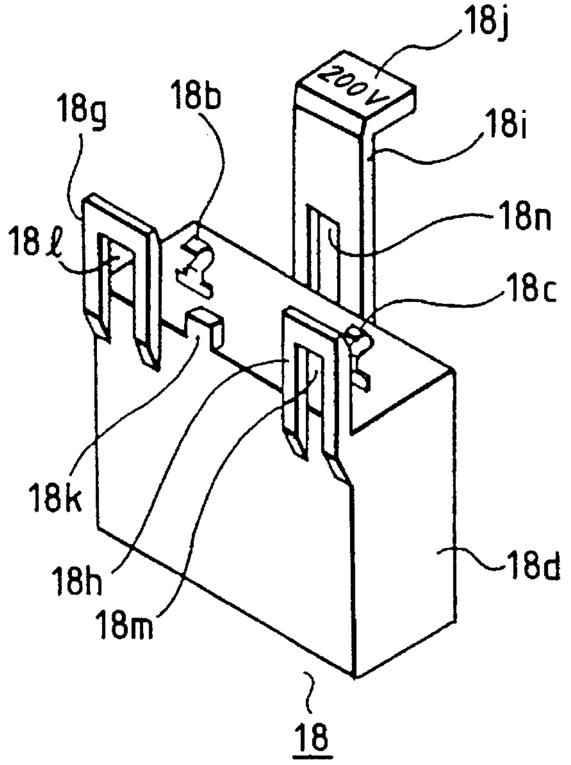
FIGS. 11(*a*)–11(*c*) are concerned with a sixth preferred embodiment of the present invention.
Figure 11B:
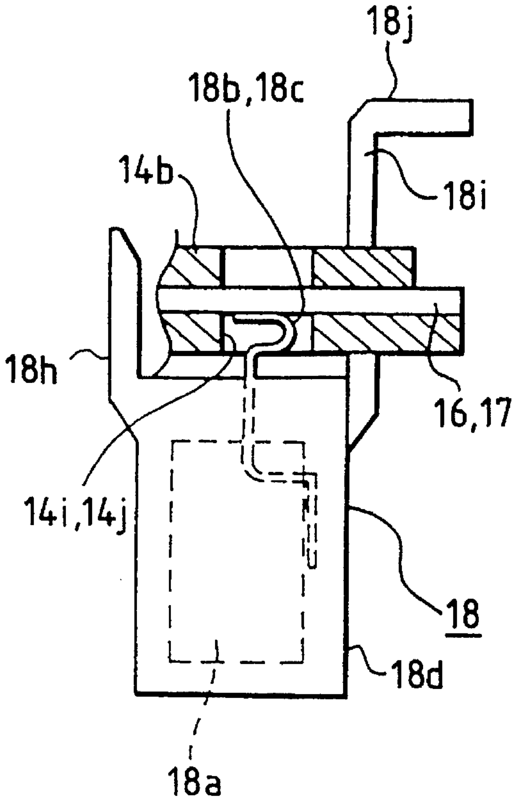
Figure 11C:
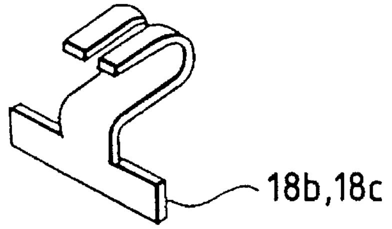

A sixth embodiment of the present invention will now be described in accordance with FIGS. 11(*a*)–11(*c*). As shown in FIG. 11(*c*), absorber terminals 18*b*, 18*c* made of a conductive plate spring material are formed in a substantially U shape.

As shown in FIG. 11(*b*), when a surge absorber 18 is connected with a coil spool 14, said absorber terminals 18*b*, 18*c* make contact with a start-of-winding coil terminal 16 and an end-of-winding coil terminal 17 through contact windows 14*i*, 14*j* of the coil spool 14 and are electrically connected in parallel with a magnetic coil winding 15. At this time, the absorber terminals 18*b*, 18*c* transform elastically and the spring pressure serves as the pressure for contact with the start-of-winding coil terminal 16 and end-of-winding coil terminal 17. The other parts are essentially identical to those of the first embodiment and therefore will not be described.

In the above design, the electrical connection of the coil terminals 16, 17 and corresponding absorber terminals 18*b*, 18*c* is extremely excellent if the dimensional accuracy of the surge absorber 18 and coil spool 14 is not particularly high.

The absorber terminals 18*b*, 18*c* made of a conductive plate spring material and formed in a substantially U shape are split to be a dipole as shown in FIG. 11(*c*), whereby if one absorber terminal portion does not make contact with the corresponding coil terminal 16 or 17, there is a strong possibility that the other absorber terminal portion will contact. Hence, the electrical connection reliability of the coil terminals 16, 17 and corresponding absorber terminals 18*b*, 18*c* are further enhanced.

The absorber terminals 18*b*, 18*c* may be replaced by coil springs to achieve identical effects.

Figure 12A:
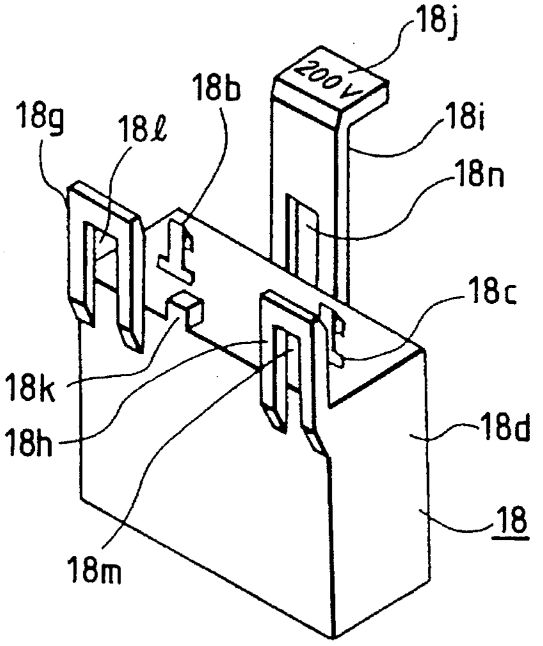
FIGS. 12(*a*)–12(*c*) are concerned with a seventh preferred embodiment of the present invention.
Figure 12B:
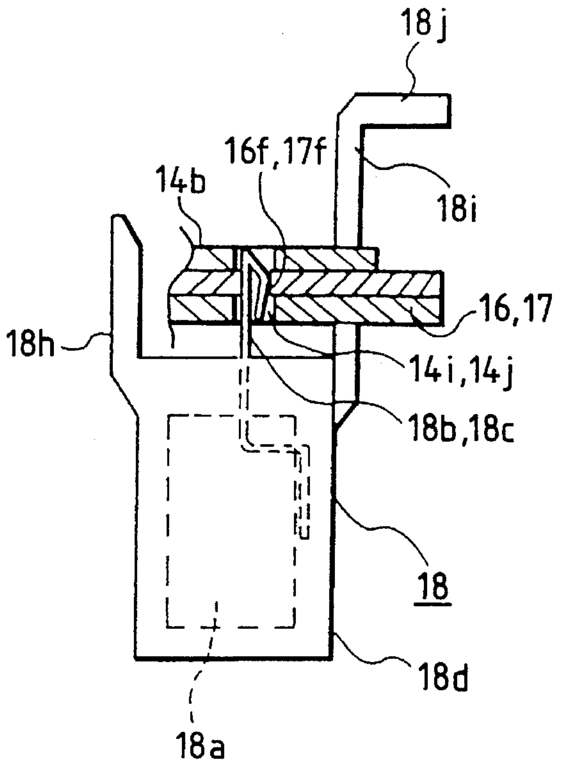
Figure 12C:
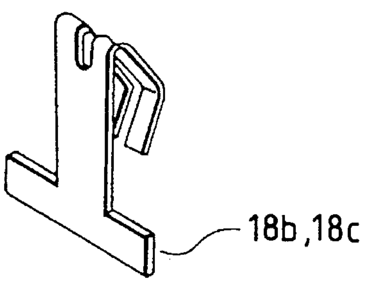

A seventh embodiment of the present invention will now be described in accordance with FIGS. 12(*a*) and 12(*b*). As shown in FIG. 12(*a*), absorber terminals 18*b*, 18*c* made of a conductive plate spring material are formed in a substantially reverse U shape, and through holes 16*f*, 17*f* into which said substantially reverse U-shaped absorber terminals 18*b*, 18*c* are inserted are formed in coil terminals 16, 17.

As shown in FIG. 12(*b*), when a surge absorber 18 is connected with a coil spool 14, said absorber terminals 18*b*, 18*c* are inserted into the through holes 16*f*, 17*f* of the start-of-winding coil terminal 16 and end-of-winding coil terminal 17 through engagement holes 14*i*, 14*j* of the coil spool 14, make contact with the inner walls of the through holes 16*f*, 17*f*, and are electrically connected in parallel with a magnetic coil winding 15. At this time, the absorber terminals 18*b*, 18*c* transform elastically and the spring pressure serves as the pressure for contact with the start-of-winding coil terminal 16 and end-of-winding coil terminal 17. The other parts are essentially identical to those of the first embodiment and therefore will not be described.

In the above design, the electrical connection of the coil terminals 16, 17 and corresponding absorber terminals 18*b*, 18*c* is extremely excellent if the dimensional accuracy of the surge absorber 18 and coil spool 14 is not particularly high. Further, since the absorber terminals 18*b*, 18*c* slide on the inner walls of the through holes 16*f*, 17*f* of the corresponding coil terminals 16, 17 when they are inserted into the through holes 16*f*, 17*f*, oxidized films formed on the inner walls of the through holes 16*f*, 17*f* are removed, further improving contact reliability.

The absorber terminals 18*b*, 18*c* made of a conductive plate spring material and formed in a substantially reverse U shape are split to be a dipole as shown in FIG. 12(*c*), whereby if one absorber terminal portion does not make contact with the corresponding coil terminal 16 or 17, there is a strong possibility that the other absorber terminal portion will contact. Hence, the electrical connection reliability of the coil terminals 16, 17 and corresponding absorber terminals 18*b*, 18*c* are further enhanced.

Figure 13:
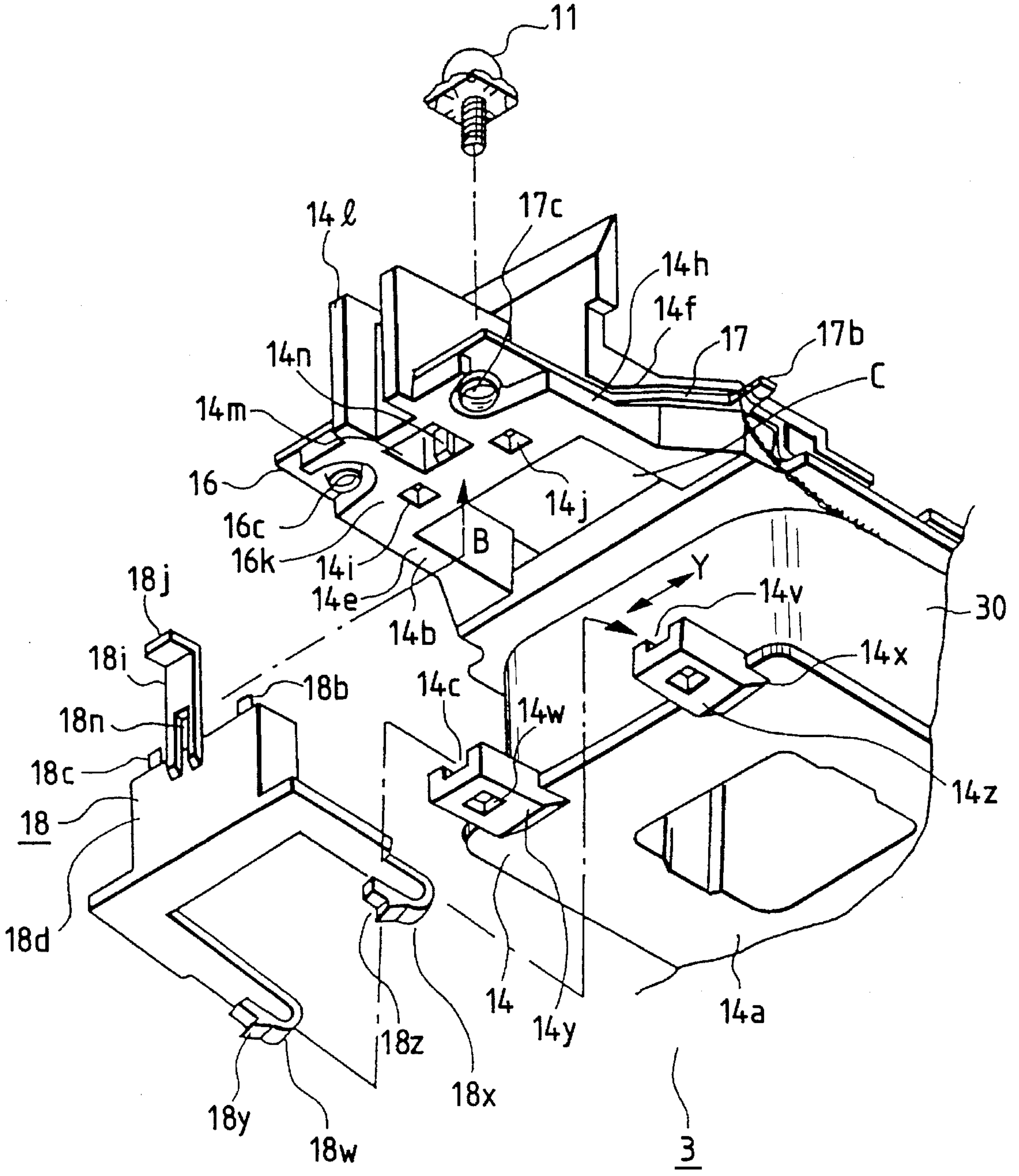
FIG. 13 is a perspective view of a magnetic coil and a surge absorber concerned with an eighth preferred embodiment of the present invention.

An eighth embodiment of the present invention will now be described in accordance with FIG. 13. As shown, the flange of a coil spool 14 is provided slidable in a Y direction with a first engagement portion (first matching recess) 14*y* having an engagement slot 14*u* and an engagement hole 14*w* and a second engagement portion (second matching recess) 14*z* having an engagement slot 14*v* and an engagement hole 14*x*. When the coil spool 14 is wound with a winding, the first and second engagement portions 14*y*, 14*z* are fixed unslidably with adhesive or the like in positions corresponding to the coil rating of the winding 15 wound.

Meanwhile, a first and a second substantially U-shaped elastic engagement portions (first and second matching protrusions) 18*w*, 18*x* which are engaged with engagement slots 14*u*, 14*v* and engagement holes 14*w*, 14*x* of the first and second engagement portions 14*y*, 16*z* are molded integrally with the bottom of a surge absorber 18.

When the surge absorber 18 is connected with the coil spool 14, absorber terminals 18*b*, 18*c* are inserted into engagement holes 14*i*, 14*j* in the coil spool 14 and the first and second substantially U-shaped elastic engagement portions 18*w*, 18*x* are engaged with the engagement slots 14*u*, 14*v* of the first and second engagement portions 14*y*, 14*z*, and engagement catches 18*y*, 18*z* are engaged with the engagement holes 14*w*, 14*x*, respectively. The elastic force of the first and second substantially U-shaped elastic engagement portions 18*w*, 18*x* causes the whole surge absorber 18 to be pressed toward the coil terminals 16, 17, whereby the absorber terminals 18*b*, 18*c* come into electrical contact with the corresponding coil terminals 16, 17 and are electrically connected in parallel with a magnetic coil winding 15. The other parts are essentially identical to those of the first embodiment and therefore will not be described.

In the above design, the electrical connection of the coil terminals 16, 17 and the corresponding absorber terminals 18*b*, 18*c* is extremely excellent if the dimensional accuracy of the surge absorber 18 and coil spool 14 is not particularly high.

Also, when the coil spool 14 is wound with the winding, the first and second engagement portions 14*y*, 14*z* are fixed unslidably with adhesive or the like in positions corresponding to the coil rating of the winding 15. Hence, if it is attempted to assemble the surge absorber 18, which does not match the voltage rating of the magnetic coil 3, into the coil spool 14*i* the first and second substantially U-shaped elastic engagement portions 18*w*, 18*x* do not fit into the first and second engagement portions 14*y*, 14*z*, thereby hindering the assembling of the surge absorber 18 which does not match the voltage rating of the magnetic coil 3. Further, the first and second engagement portions 14*y*, 14*z* provided slidable to function as the matching protrusions or matching recesses eliminate the requirement of preparing a plurality of different coil spools 14 having the first and second engagement portions 14*y*, 14*z* for each coil rating.

Figure 14A:
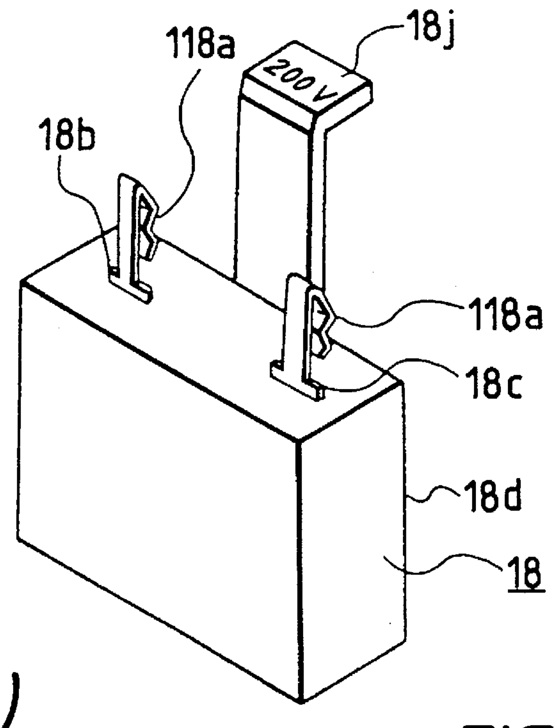
FIGS. 14(*a*)–14(*c*) are concerned with a ninth preferred embodiment of the present invention.
Figure 14B:
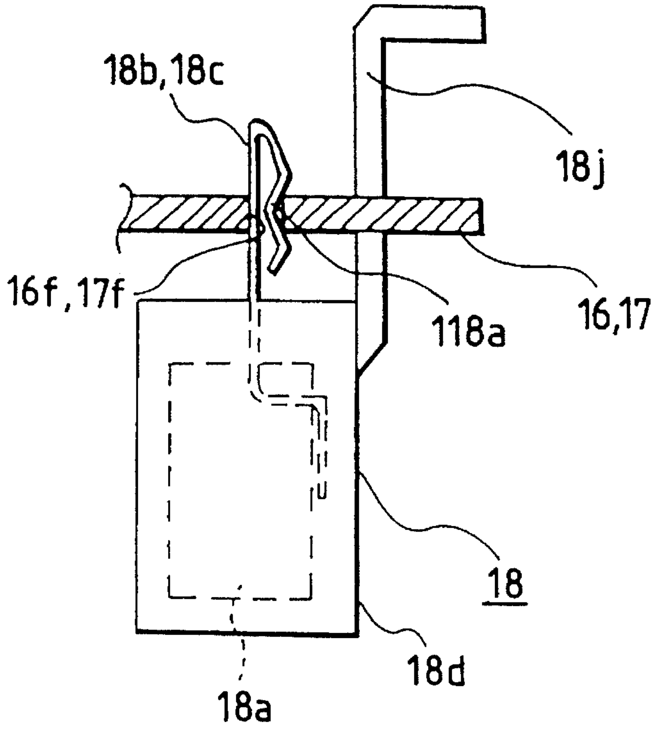
Figure 14C:
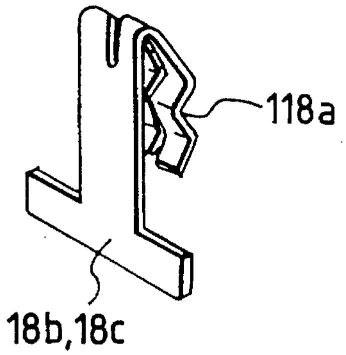

A ninth embodiment of the present invention will now be described in accordance with FIGS. 14(*a*)–14(*c*). As shown in FIG. 14(*c*), absorber terminals 18*b*, 18*c* made of a conductive plate spring material are formed in a substantially reverse U shape, and through holes 16*f*, 17*f* into which the substantially reverse U-shaped absorber terminals 18*b*, 18*c* are inserted are formed in corresponding coil terminals 16, 17.

As shown in FIG. 14(*b*), when a surge absorber 18 is connected with a coil spool 14, the absorber terminals 18*b*, 18*c* are inserted into the through holes 16*f*, 17*f* of the start-of-winding coil terminal 16 and end-of-winding coil terminal 17 through engagement holes 14*i*, 14*j* of the coil spool 14, make contact with the inner walls of the through holes 16*f*, 17*f*, and are electrically connected in parallel with a magnetic coil winding 15. In addition, engagement recesses 118*a* are engaged with the inner walls of the through holes 16*f*, 17*f*, whereby the absorber terminals 18*b*, 18*c* themselves serve as the elastic engagement portions 18*g*, 18*h*, 18*i* of the first embodiment to mechanically connect the surge absorber 18 to the coil terminals 16, 17. At this time, the absorber terminals 18*b*, 18*c* transform elastically and the spring pressure serves as the pressure for contact with the start-of-winding coil terminal 16 and end-of-winding coil terminal 17 and as the force of mechanical connection between the coil terminal 16, 17 and the surge absorber 18. The other parts are essentially identical to those of the first embodiment and therefore will not be described.

In the above design, the electrical connection of the coil terminals 16, 17 and corresponding absorber terminals 18*b*, 18*c* is extremely excellent if the dimensional accuracy of the surge absorber 18 and coil spool 14 is not particularly high. Also, since the absorber terminals 18*b*, 18*c* slide on the inner walls of the through holes 16*f*, 17*f* of the corresponding coil terminals 16, 17 when they are inserted into the through holes 16*f*, 17*f*, oxidized films formed on the inner walls of the through holes 16*f*, 17*f* are removed, further improving contact reliability. Further, it is not necessary to furnish the surge absorber 18 with the elastic engagement portions 18*g*, 18*h*, 18*i* as shown in the first embodiment. This leads to the simplification, etc., of the molding die of the surge absorber 18.

The absorber terminals 18*b*, 18*c* made of a conductive plate spring material and formed in a substantially reverse U shape are split to be a dipole as shown in FIG. 14(*c*), whereby if one absorber terminal portion does not make contact with the corresponding coil terminal 16 or 17, there is a strong possibility that the other absorber terminal portion will contact. Hence, the electrical connection reliability of the coil terminals 16, 17 and corresponding absorber terminals 18*b*, 18*c* are further enhanced.

Figure 15:
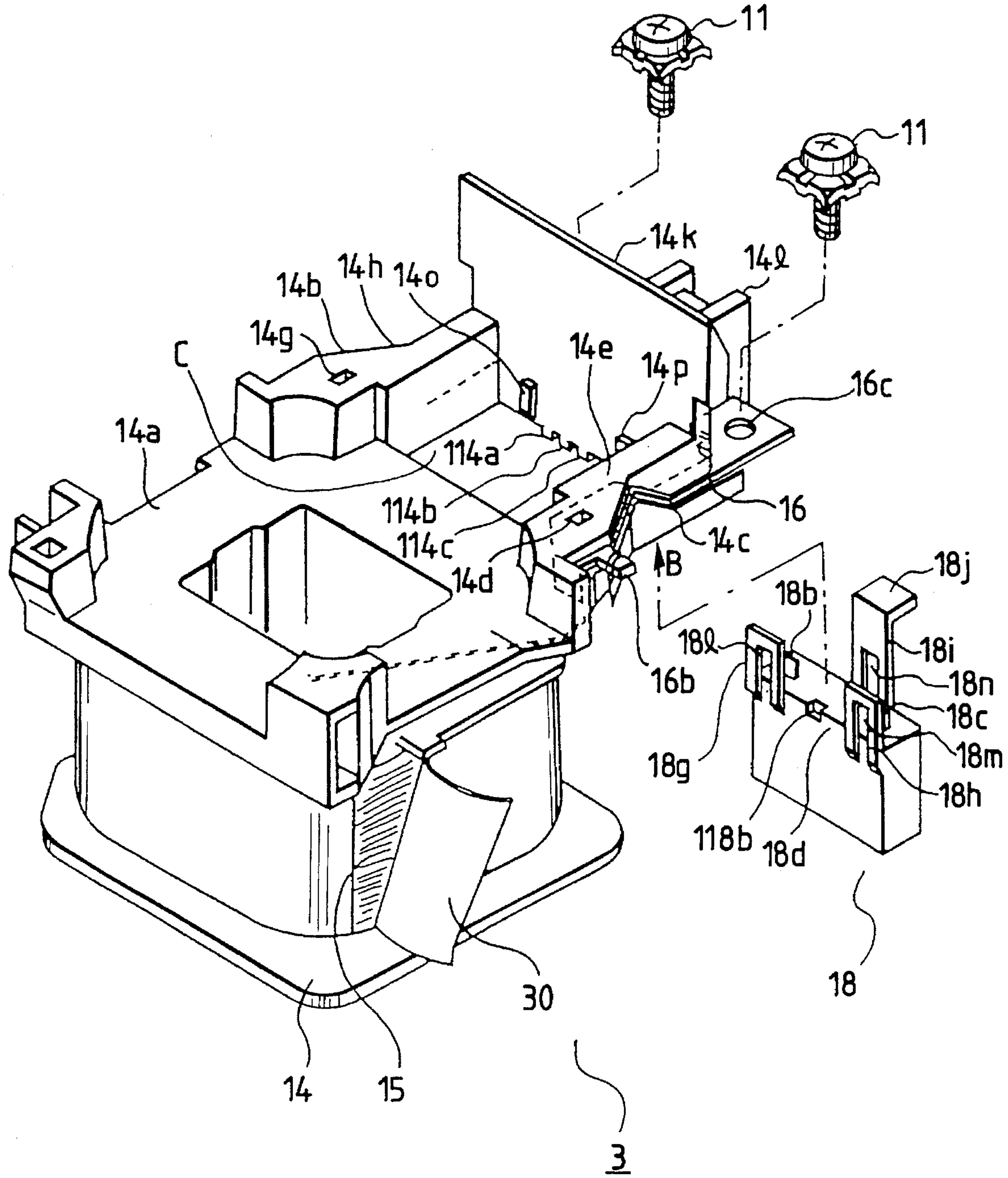
FIG. 15 is a perspective view of a magnetic coil and a surge absorber concerned with a tenth preferred embodiment of the present invention.

A tenth embodiment of the present invention will now be described in accordance with FIG. 15. As shown, a connection portion 14*k* of a coil spool 14 is provided with a plurality of matching protrusions 114*a*, 114*b*, 114*c* in positions corresponding to the coil rating of a winding wound around the coil spool 14. When the coil spool 14 is wound with the winding, only one of said plurality of matching protrusions 114*a*, 114*b*, 114*c* corresponding to the coil rating of the winding wound is left and the other matching protrusions are deleted. For example, if the matching protrusion 114*b* corresponds to the coil rating of the winding wound, that matching protrusion 114*b* is left and the other matching protrusions 114*a*, 114*c* are deleted.

In the above design, if it is attempted to assemble the surge absorber 18, which does not match the voltage rating of the magnetic coil 3, into the coil spool 14, a matching recess 118*b* in the surge-absorber 18 does not fit into the matching protrusions of the coil spool 14 and engagement windows 18*l*, 18*m*, 18*n* formed in elastic engagement portions 18*g*, 18*h*, 18*i* cannot be engaged with engagement projections 14*n*, 14*o*, 14*p* of the coil spool 14, thereby hindering the assembling of the surge absorber 18 which does not match the voltage rating of the magnetic coil 3 and also eliminating the requirement of preparing a plurality of different coil spools 14 having the matching protrusions for each coil rating.

Identical effects can also be produced by replacing the plurality of matching protrusions 114*a*, 114*b*, 114*c* of the coil spool 14 with a plurality of matching recesses, replacing the matching recess 118*b* of the surge absorber 18 with a matching protrusion, and leaving only the matching recess corresponding to the coil rating of the winding wound around the coil spool 14 and filling up the other matching recesses.

Figure 16A:
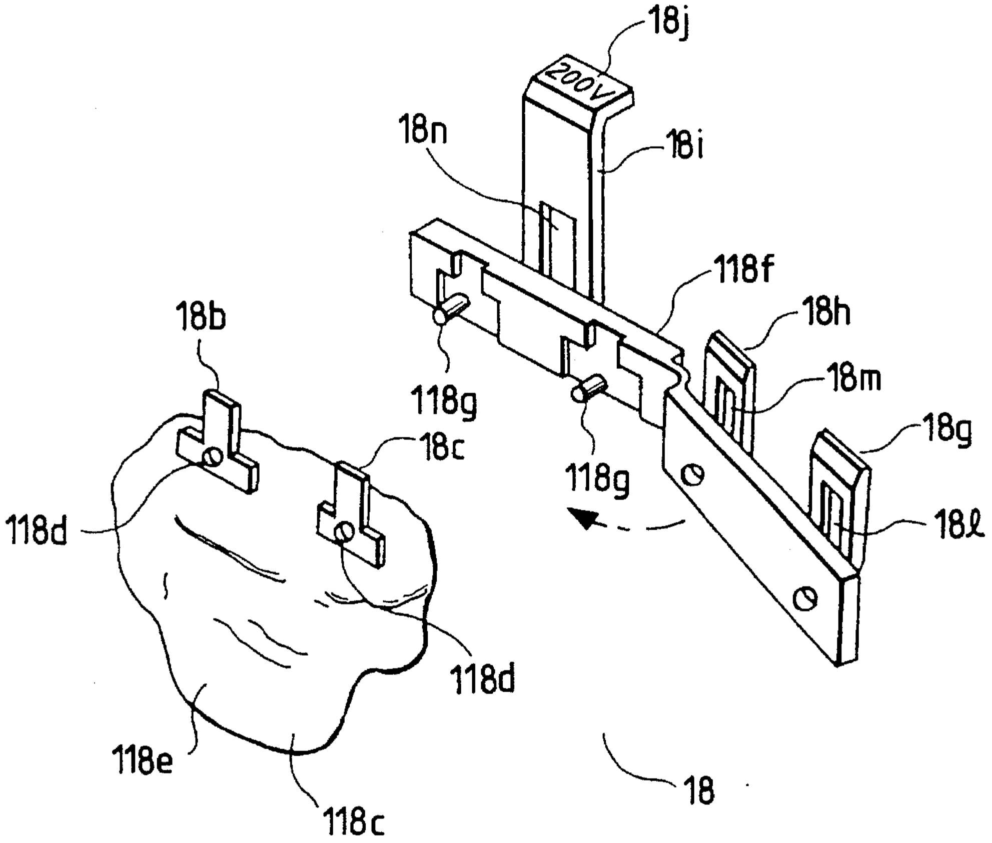
FIGS. 16(*a*)–16(*c*) are concerned with an eleventh preferred embodiment of the present invention.
Figure 16B:
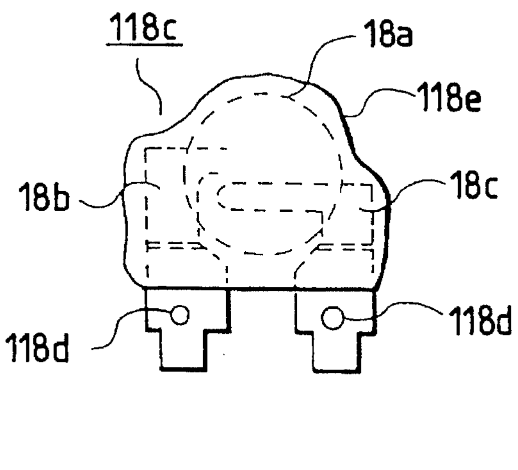
Figure 16C:
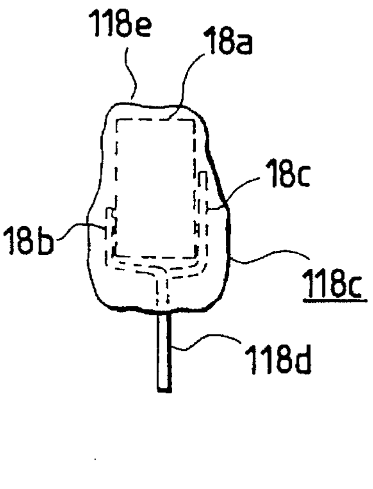

An eleventh embodiment of the present invention will now be described in accordance with FIGS. 16(*a*)–16(*c*). FIG. 16(*a*) is an exploded perspective view of a surge absorber for use with a magnetic coil concerned with the eleventh embodiment of the present invention, and FIGS. 16(*b*) and 16(*c*) are surge absorber body arrangement diagrams. Referring to these drawings, 118*c* indicates a surge absorber body were absorber terminals 18*b*, 18*c* having combination holes 118*d* are electrically joined to a surge absorbing device 18*a*, and on said joint, its housing is formed by powder-coated isolation painting (epoxy resin, etc., are used) 118*e* and the positions of the absorber terminals 18*b*, 18*c* are fixed to provide mutual isolation.

118*f* indicates a hinge-shaped cover having elastic engagement portions 18*g*, 18*h*, 18*i*, and engagement windows 18*l*, 18*m*, 18*n* formed in the elastic engagement portions 18*g*, 18*h*, 18*i* are designed to be engaged and connected with engagement projections 14*n*, 14*o*, 14*p* of a coil spool 14. A pair of combining projections 118*g*, which are formed on the bottom of a cover 118*f*, fit into the combination holes 118*d* provided in the absorber terminals 18*b*, 18*c* and the cover 118*f* is pressed against the absorber terminals 18*b*, 18*c* to integrate the cover 118*f* and powder-coated surge absorber body 118*c*. The other parts are essentially identical to those of the first embodiment and therefore will not be described.

In the above design, the surge absorber 18 can be thinned.

A twelfth embodiment of the present invention will now be described in accordance with FIG. 17.

Figure 17:
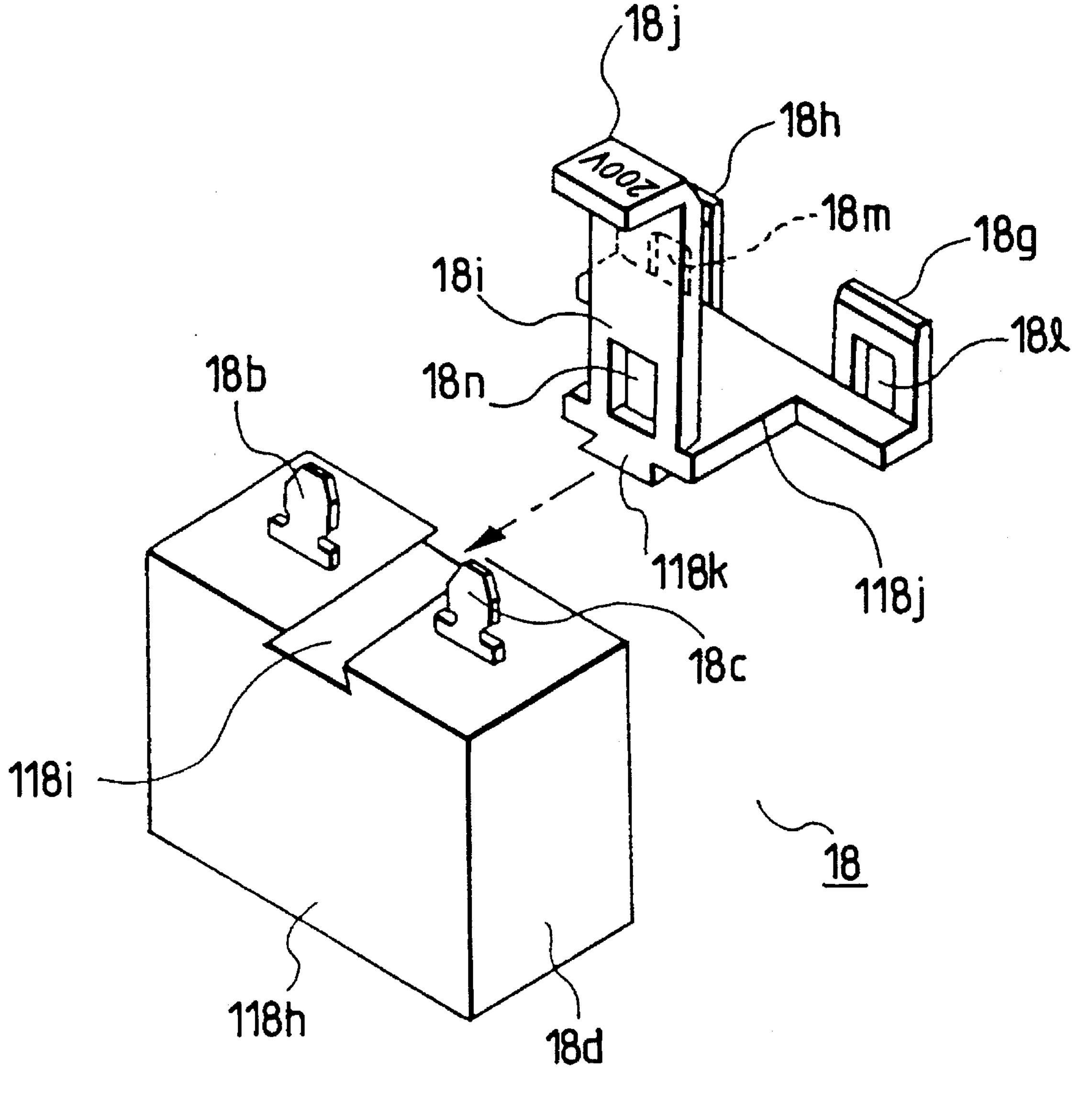
FIG. 17 is a perspective view illustrating a surge absorber in the process of manufacturing, concerned with a twelfth preferred embodiment of the present invention.

FIG. 17 is an exploded perspective view of a surge absorber for use with a magnetic coil concerned with the twelfth embodiment of the present invention. In FIG. 17, 118*h* indicates a surge absorber body wherein absorber terminals 18*b*, 18*c* are electrically joined to a surge absorbing device, its housing is formed by molded resin 18*d*, e.g., phenol or polybutylene terephthalate having high mechanical strength and excellent heat resistance, and the positions of the absorber terminals 18*b*, 18*c* are fixed to provide mutual isolation. On said surge absorber body 118*h*, a combining slot 118*i* also serving to increase the isolation distance between the absorber terminals 18*b* and 18*c* is formed simultaneously at the time of molding.

118*j* indicates a cover molded by synthetic resin, e.g., nylon, excellent in elasticity and having elastic engagement portions 18*g*, 18*h*, 18*i* and a combining projection 118*k* engaged with the combining slot 118*i* of the surge absorber body 118*h*. When said combining projection 118*k* engages with the combining slot 118*i* of the surge absorber body 118*h*, said cover 118*j* constitutes the surge absorber 18. The other parts are essentially identical to those of the first embodiment and therefore will not be described.

When the surge absorber 18 is arranged as described above by forming the surge absorber body 118*h* and cover 118*j* individually, different synthetic resins can be used with the surge absorber body 118*h* and cover 118*j* according to the performance requested, i.e., synthetic resin, such as phenol or polybutylene terephthalate having high mechanical strength and excellent heat resistance, can be used as the synthetic resin for molding the surge absorber body 118*h* and synthetic resin, such as nylon, having excellent elasticity and a wide variety of colors can be used as the synthetic resin for molding the cover 118*j*.

As a result, the surge absorber 18 can be made excellent electrically and mechanically.

Also, the cover 118*j*, which is built by using synthetic resin, e.g., nylon, having a wide variety of colors, can be color-coded according to the coil rating.

Further, the simplified molding die facilitates molding, and the combining slot 118*i* serving to increase the isolation distance between the absorber terminals 18*b* and 18*c* allows the surge absorber 18 itself to be compact.

A thirteenth embodiment of the present invention will now be described in accordance with FIGS. 18(*a*)–18(*d*), which shows the arrangement of a surge absorber for use with a magnetic coil concerned with the thirteenth embodiment of the present invention. As shown, absorber terminals 18*b*, 18*c* are provided with narrow areas 118*l*, 118*m* and made of metal having a low fluxing point. Said absorber terminals 18*b*, 18*c* are designed to function as a fuse which prevents the explosive damage of a surge absorbing device 18*a* due to extremely large lightening surges, wrong voltage rating, or other factors.

In order to prevent the explosive damage of the surge absorbing device 18*a* due to extremely large lightening surges, wrong voltage rating, or other factors, recesses 18*u*, 18*v* into which conductive coil springs 18*s*, 18*t* are fitted may be formed at the roots of portions protruding from molded resin 18*d* of the absorber terminals 18*b*, 18*c*, and at the same time, the coil springs 18*s*, 18*t* made of low fluxing point metal and making elastically electrical contact with corresponding coil terminals 16, 17 as shown in the fifth embodiment may be fit in the recesses 18*u*, 18*v* of the absorber terminals 18*b*, 18*c* so as not to be removed from the absorber terminals 18*b*, 18*c*, whereby the coil springs 18*s*, 18*t* function as a fuse.

Figure 19:
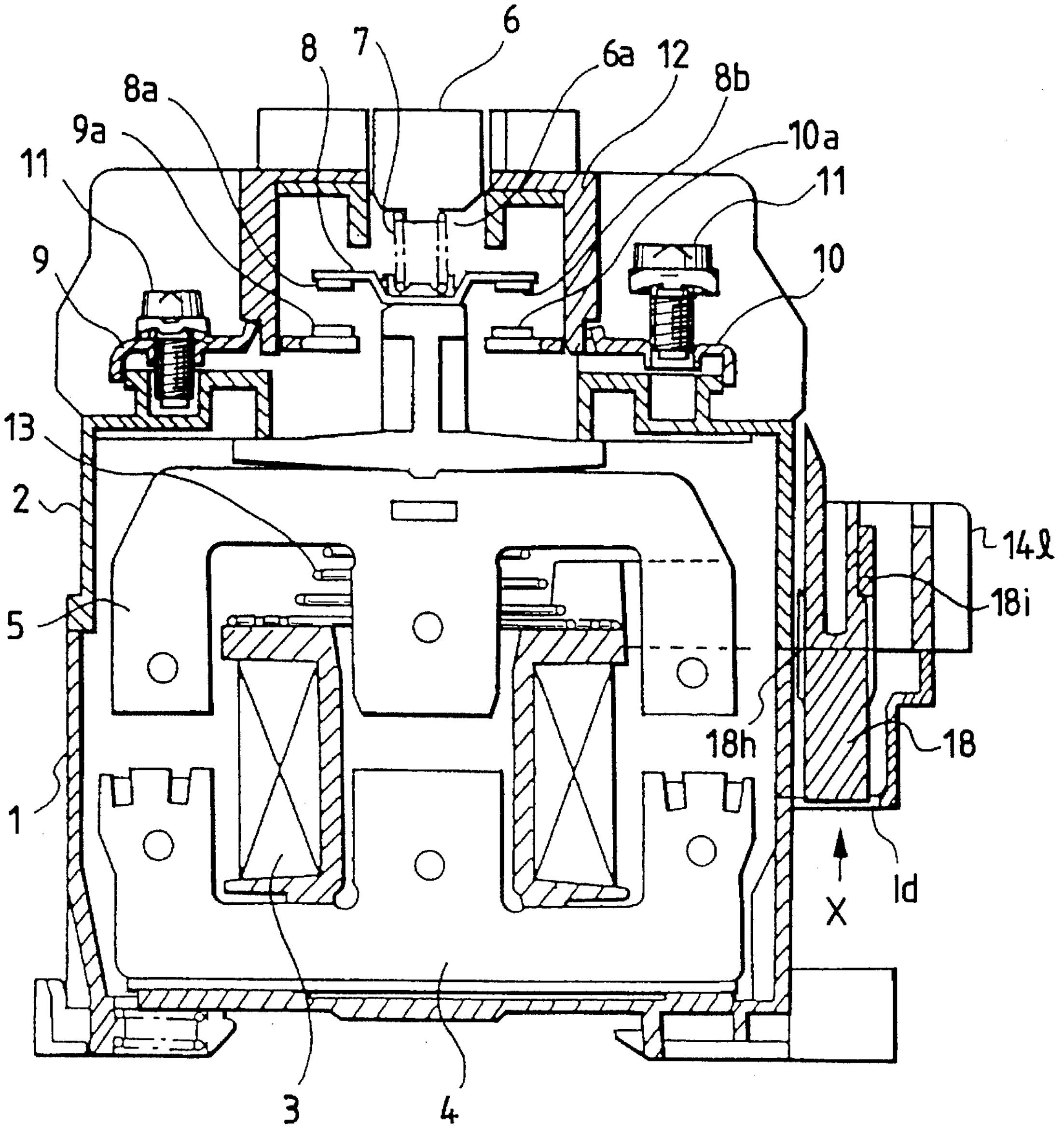
FIG. 19 is a front sectional view of a magnetic contactor concerned with the fourteenth preferred embodiment of the present invention.
Figure 20:
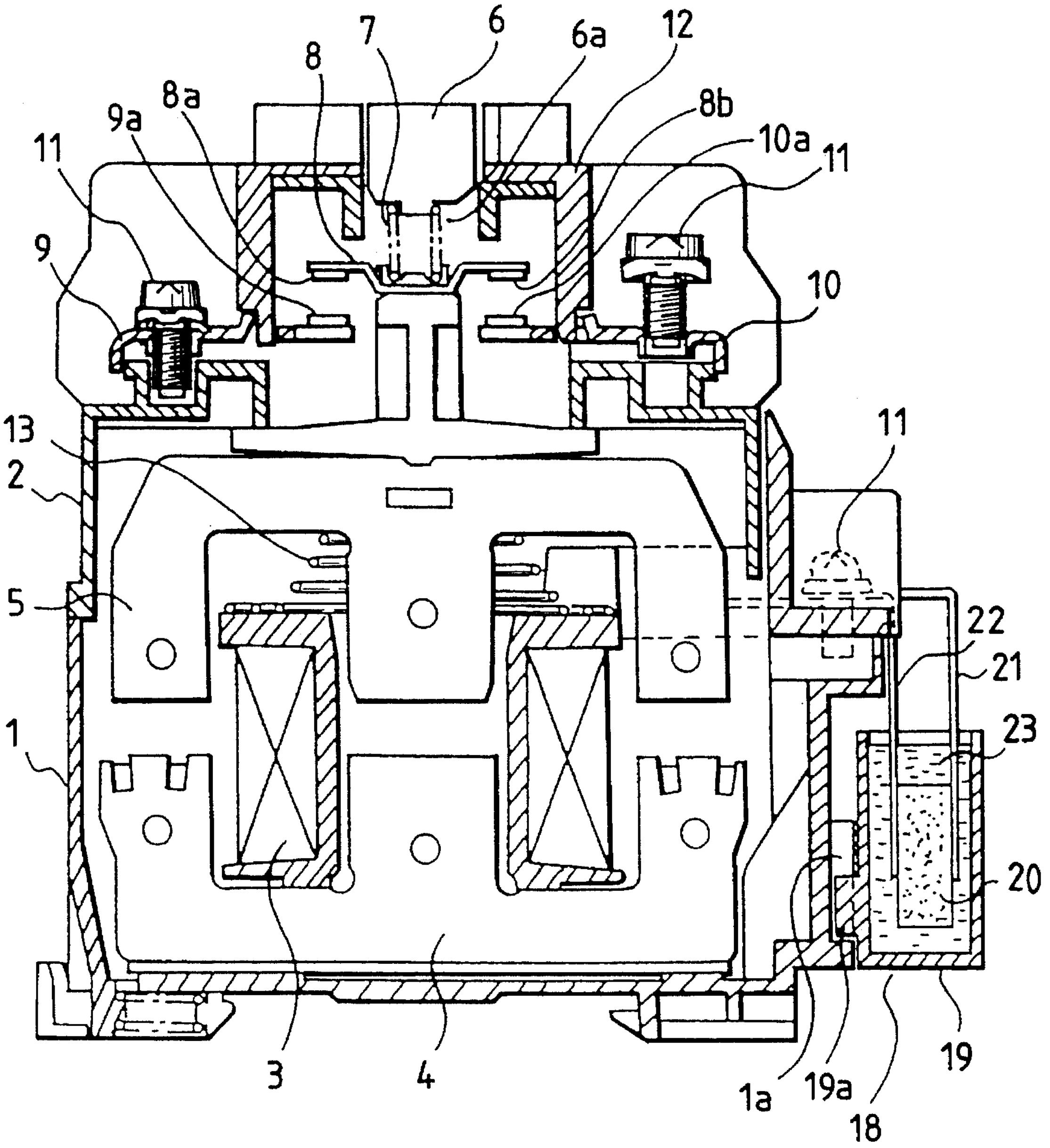
FIG. 20 PRIOR ART
FIG. 20 is a front sectional view of a magnetic contactor in which a magnetic coil known in the art is contained.
Figure 21:
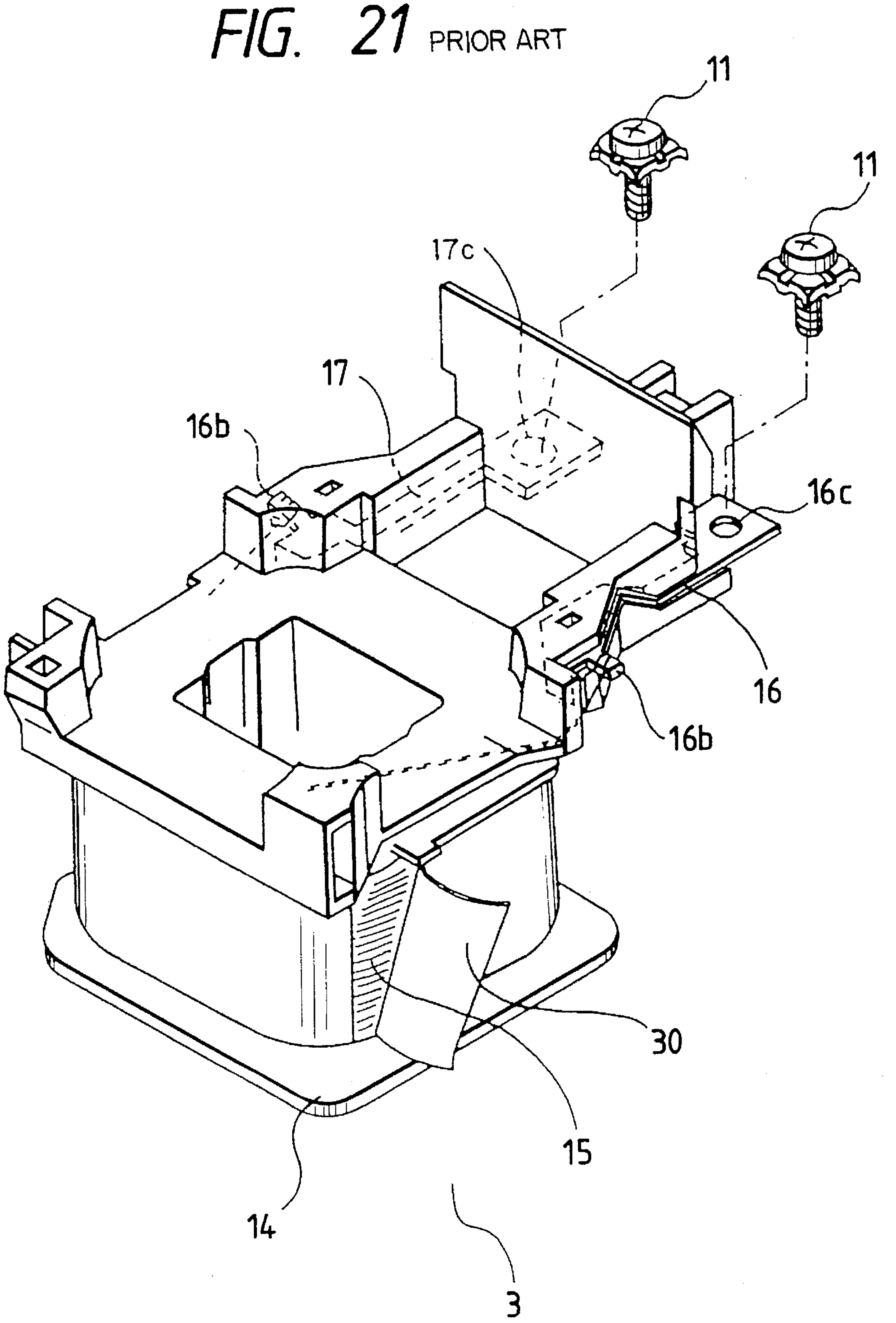
FIG. 21 PRIOR ART
FIG. 21 is a perspective view of the magnetic coil known in the art.
Figure 22:
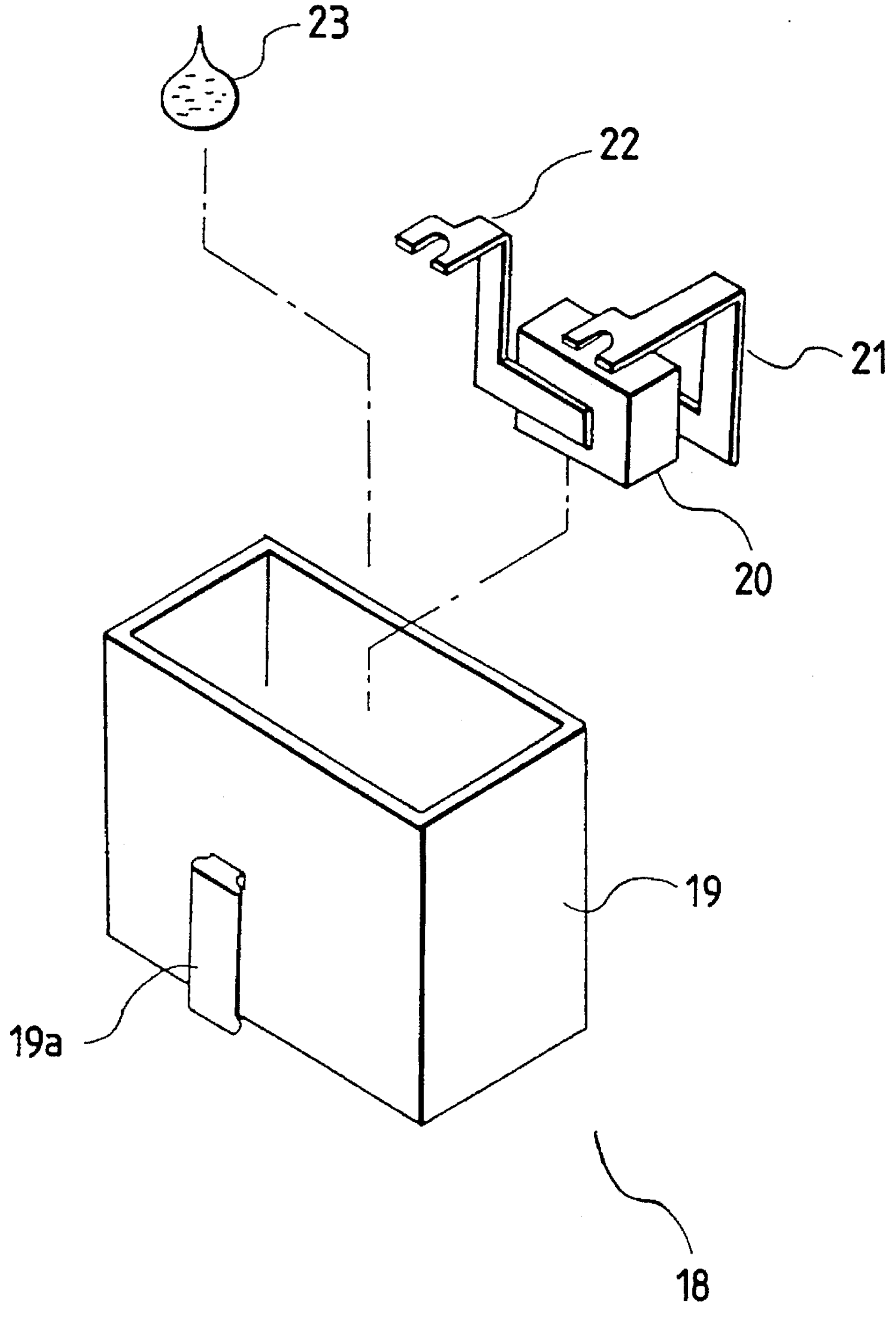
FIG. 22 PRIOR ART
FIG. 22 is an exploded perspective view of a surge absorber of the magnetic coil known in the art.

Finally, a fourteenth embodiment of the present invention will now be described in accordance with FIG. 19. In the present embodiment, as is clear from the drawing, the wall surface of a mounting base 1 is provided with a hole 1*d* where the surge absorber 18 can be inserted in a direction in which the surge absorber 18 is mechanically connected with coil terminals 16, 17 or a coil spool 14.

This design allows the surge absorber 18 to be connected mechanically and electrically with the coil terminals 16, 17 or coil spool 14 after a magnetic coil 3 is housed in an electrical equipment vessel. Also, if the surge absorber 18 is damaged during use of the electrical equipment, it can be changed without removing the magnetic coil 3 from the mounting base 1.

In the present invention, any of the embodiments described above may be combined as appropriate.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A magnetic coil for use with a surge absorber having absorber terminals in a magnetic coil assembly, wherein said magnetic coil comprises:

a coil spool;

a winding wound around said coil spool; and coil terminals installed on said coil spool and electrically connected with said winding; and wherein said surge absorber is releasably locked to at least one of said coil spool and said coil terminals by means integral with at least one of said surge absorber, said coil spool, and said coil terminals, wherein said surge absorber is releasably locked to said at least one of said coil spool and said coil terminals such that said surge absorber is automatically removed from said magnetic coil assembly when said magnetic coil is removed from said magnetic coil assembly, wherein the absorber terminals of said surge absorber are disposed to make contact with said coil terminals to electrically connect said coil terminals and said absorber terminals, and wherein said surge absorber may be disconnected from said magnetic coil solely by unlocking said means.

2. A magnetic coil for use with a surge absorber having absorber terminals in a magnetic coil assembly, wherein said magnetic coil comprises:

a coil spool;

a winding wound around said coil spool; and coil terminals installed on said coil spool and electrically connected with said winding; and wherein said surge absorber is releasably locked to, and removable in one direction from, at least one of said coil spool and said coil terminals by elastic engagement means integral with at least one of said surge absorber, said coil spool, and said coil terminals, wherein said surge absorber is releasably locked to said at least one of said coil spool and said coil terminals such that said surge absorber is automatically removed from said magnetic coil assembly when said magnetic coil is removed from said magnetic coil assembly, wherein said absorber terminals are disposed to make contact with said coil terminals to electrically connect said coil terminals and said absorber terminals, and wherein said surge absorber may be disconnected from said magnetic coil solely by unlocking said elastic engagement means.

3. A magnetic coil for use with a surge absorber having absorber terminals in a magnetic coil assembly, wherein said magnetic coil comprises:

a coil spool;

a winding wound around said coil spool; and coil terminals installed on said coil spool and electrically connected with said winding;

wherein said absorber terminals comprise elastic engagement portions, wherein said engagement portions are releasably locked to said coil terminals to connect said surge absorber with said coil terminals mechanically and electrically, wherein said engagement portions are removable in one direction, and wherein said engagement portions are releasably locked to said coil terminals such that said surge absorber is automatically removed from said magnetic coil assembly when said magnetic coil is removed from said magnetic coil assembly.

4. A magnetic coil assembly comprising:

a resin coil spool comprising a coil spool body, having a winding axis and at least two flanges disposed orthogonal to said winding axis;

a winding wound around said coil spool body between said coil spool flanges, and defining a winding space;

a start-of-winding coil terminal installed on said coil spool to extend in a direction of intersection with said winding axis of said coil spool and electrically connected with a winding start of said winding;

an end-of-winding coil terminal installed on said coil spool to extend in a substantially identical direction to and substantially in parallel with the extending direction of the start-of-winding coil terminal and electrically connected with a winding end of said winding; and a surge absorber comprising a body and absorber terminals that project from said absorber body and are electrically connectable with said coil terminals;

wherein at least one of said coil spool flanges comprises grooves into which said coil terminals are inserted correspondingly, and a coil terminal support having holes linked with said grooves;

wherein said coil terminals are provided with engagement portions engaged with said holes to mechanically lock said coil terminals when said coil terminals are inserted into said grooves of said coil terminal support correspondingly;

wherein said surge absorber is releasably locked to said at least one of said coil spool flanges by elastic engagement means integral with one of said surge absorber and said at least one of said coil spool flanges;

wherein said absorber terminals are insertable into said holes so as to be electrically connected with said coil terminals;

wherein said surge absorber may be disconnected from said at least one of said coil spool flanges solely by unlocking said elastic engagement means, and wherein said surge absorber is releasably locked to said at least one of said coil spool flanges such that said surge absorber is automatically removed from said magnetic coil assembly when said at least one of said coil spool flanges is removed from said magnetic coil assembly.

5. A magnetic coil assembly comprising:

a resin coil spool comprising a coil spool body, having a winding axis and at least two flanges disposed orthogonal to said winding axis;

a winding wound around said coil spool body between said coil spool flanges and defining a winding side portion;

a start-of-winding coil terminal installed on said coil spool to extend in a direction of intersection with said winding axis of said coil spool and electrically connected with a winding start of said winding;

an end-of-winding coil terminal installed on said coil spool to extend in a substantially identical direction to and substantially in parallel with the extending direction of the start-of-winding coil terminal and electrically connected with a winding end of said winding; and a surge absorber comprising a body and absorber terminals that are electrically connectable with said coil terminals;

wherein said surge absorber is releasably locked to at least one of said coil spool and said coil terminals by elastic engagement means integral with said surge absorber, so as to be located in a space formed by said coil terminals and said winding side portion;

wherein said absorber terminals are contactable with said coil terminals to electrically connect the coil terminals and said absorber terminals;

wherein said surge absorber may be disconnected from said said at least one of said coil spool and said coil terminals solely by unlocking said elastic engagement means; and wherein said surge absorber is releasably locked to said at least one of said coil spool and said coil terminals such that said surge absorber is automatically removed from said magnetic coil assembly when said at least one of said coil spool and said coil terminals is removed from said magnetic coil assembly.

6. The magnetic coil assembly as defined in claim 5, wherein said assembly comprises a housing vessel with a window and said surge absorber is provided with a capacity-rating indicator portion which is visible through said window outside of said vessel when said magnetic coil is housed in said vessel.

7. The magnetic coil assembly as defined in claim 6, wherein said engagement means of said surge absorber also serves as said indicator portion.

8. The magnetic coil assembly as defined in claim 6, wherein a rib for preventing the movement of the surge absorber toward the winding is provided on said vessel.

9. The magnetic coil assembly as defined in claim 5, wherein said surge absorber body is formed by isolation-painting a housing on the joint of the absorber terminals to a surge absorbing device and engagement portions and other parts are formed on said surge absorber body by fitting resin-molded members thereon, wherein said engagement portions are at least a part of said elastic engagement means.

10. The magnetic coil assembly as defined in claim 5, wherein said surge absorber body comprises a surge absorbing device joined to said absorber terminals and said surge absorber comprises engagement members, said surge absorber body and said engagement members being formed separately by resin molding and being connected mechanically and removably, wherein said engagement members are at least part of said elastic engagement means.

11. A magnetic coil assembly comprising:

a resin coil spool comprising a coil spool body, having a winding axis and at least two flanges disposed orthogonal to said axis;

a winding wound around said coil spool body between said flanges and defining a winding side portion;

a start-of-winding coil terminal installed on said coil spool to extend in a direction of intersection with winding axis of said coil spool and electrically connected with the winding start of said winding;

an end-of-winding coil terminal installed on said coil spool to extend in a substantially identical direction to and substantially in parallel with the extending direction of the start-of-winding coil terminal and electrically connected with the winding end of said winding;

a surge absorber comprising a body and absorber terminals that are electrically connectable with said coil terminals;

wherein said surge absorber is releasably locked to at least one of said coil spool or coil terminals by elastic engagement means integral with said surge absorber, so as to be located in a space formed by said coil terminals and said winding side portion and said absorber terminals are contactable with said coil terminals to electrically connect the coil terminals and absorber terminals; and wherein the whole surge absorber is disposed to be elastically pressed toward said coil terminals by said elastic engagement means to bring said absorber terminals into contact with the coil terminals so as to make electrical connection therebetween.

12. A magnetic coil assembly comprising:

a resin coil spool comprising a coil spool body, having a winding axis and at least two flanges disposed orthogonal to said winding axis;

a winding wound around said coil spool body between said coil spool flanges, and defining a winding space;

a start-of-winding coil terminal installed on said coil spool to extend in a direction of intersection with said winding axis of said coil spool and electrically connected with a winding start of said winding;

an end-of-winding coil terminal installed on said coil spool to extend in a substantially identical direction to and substantially in parallel with the extending direction of the start-of-winding coil terminal and electrically connected with a winding end of said winding; and a surge absorber comprising a body and absorber terminals that project from said absorber body and are electrically connectable with said coil terminals;

wherein at least one of said coil spool flanges comprises grooves into which said coil terminals are inserted correspondingly, and a coil terminal support having holes linked with said grooves;

wherein said coil terminals are provided with engagement portions engaged with said holes to mechanically lock said coil terminals when said coil terminals are inserted into said grooves of said coil terminal support correspondingly;

wherein said surge absorber is releasably locked to said at least one of said coil spool flanges by elastic engagement means integral with one of said surge absorber and said at least one of said coil spool flanges;

wherein said absorber terminals are insertable into said holes so as to be electrically connected with said coil terminals;

wherein said absorber terminals projecting from said surge absorber body are spring loaded and provided mechanical and electrical contact with said coil terminals; and wherein said surge absorber is releasably locked to said at least one of said coil spool flanges such that said surge absorber is automatically removed from said magnetic coil assembly when said at least one of said coil spool flanges is removed from said magnetic coil assembly.

13. The magnetic coil assembly as defined in claim 12, wherein said spring loading is provided by at least one of coil springs and plate springs.

14. The magnetic coil assembly as defined in claim 13, wherein said plate springs are split in a dipole form.

15. A magnetic coil assembly comprising:

a resin coil spool comprising a coil spool body, having a winding axis and at least two flanges disposed orthogonal to said axis;

a winding wound around said coil spool body between said flanges, and defining a winding space;

a start-of-winding coil terminal installed on said coil spool to extend in a direction of intersection with winding axis of said coil spool and electrically connected with the winding start of said winding;

an end-of-winding coil terminal installed on said coil spool to extend in a substantially identical direction to and substantially in parallel with the extending direction of the start-of-winding coil terminal and electrically connected with the winding end of said winding;

a surge absorber comprising a body and absorber terminals that project from said absorber body and are electrically connectable with said coil terminals;

wherein at least one of said coil spool flanges comprises grooves into which said coil terminals are inserted correspondingly, and a coil terminal support having holes linked with said grooves;

wherein said coil terminals are provided with engagement portions engaged with said holes to mechanically lock said coil terminals when said coil terminals are inserted into said grooves of said coil terminal support correspondingly;

wherein said surge absorber is releasably locked to said coil spool flange by elastic engagement means integral with one of said surge absorber and coil spool flange and said absorber terminals are insertable into said holes so as to be electrically connected with said coil terminals; and wherein said surge absorber is provided with at least one of matching protrusions or matching recesses in positions corresponding to a coil rating and said coil spool flange is provided with matching recesses or matching protrusions with which said matching protrusions or matching recesses of said surge absorber match when the surge absorber is mechanically connected with the coil spool flange.

16. The magnetic coil assembly as defined in claim 15, wherein said matching protrusions or matching recesses of the coil spool are provided movably.

17. The magnetic coil assembly as defined in claim 15, wherein said coil spool flange is provided with a plurality of at least one of matching recesses and matching protrusions corresponding to a plurality of magnetic coil ratings and any of those among said plurality of at least one of matching recesses and matching protrusions that do not correspond to the rating of the coil wound around the coil spool are deleted.

18. A magnetic coil assembly comprising:

a resin coil spool comprising a coil spool body, having a winding axis and at least two flanges disposed orthogonal to said winding axis;

a winding wound around said coil spool body between said coil spool flanges and defining a winding side portion;

a start-of-winding coil terminal installed on said coil spool to extend in a direction of intersection with said winding axis of said coil spool and electrically connected with a winding start of said winding;

an end-of-winding coil terminal installed on said coil spool to extend in a substantially identical direction to and substantially in parallel with the extending direction of the start-of-winding coil terminal and electrically connected with a winding end of said winding; and a surge absorber comprising a body and absorber terminals that are electrically connectable with said coil terminals;

wherein said surge absorber is releasably locked to at least one of said coil spool and said coil terminals by elastic engagement means integral with said surge absorber, so as to be located in a space formed by said coil terminals and said winding side portion;

wherein said absorber terminals are contactable with said coil terminals to electrically connect said coil terminals and said absorber terminals;

wherein said magnetic coil assembly comprises a housing vessel with a window and said surge absorber is provided with a capacity-rating indicator portion which is visible through said window from outside of said vessel when said coil spool and said winding are housed in said vessel;

wherein a hole into which the surge absorber can be inserted is provided in a wall surface of said housing vessel in a direction in which the surge absorber is mechanically connected with said at least one of said coil spool and said coil terminals; and wherein said surge absorber is releasably locked to said at least one of said coil spool and said coil terminals such that said surge absorber is automatically removed from said magnetic coil assembly when said at least one of said coil spool and said coil terminals is removed from said magnetic coil assembly.

19. A magnetic coil assembly comprising:

a resin coil spool comprising a coil spool body, having a winding axis and at least two flanges disposed orthogonal to said winding axis;

a winding wound around said coil spool body between said coil spool flanges and defining a winding side portion;

a start-of-winding coil terminal installed on said coil spool to extend in a direction of intersection with said winding axis of said coil spool and electrically connected with a winding start of said winding;

an end-of-winding coil terminal installed on said coil spool to extend in a substantially identical direction to and substantially in parallel with the extending direction of the start-of-winding coil terminal and electrically connected with a winding end of said winding; and a surge absorber comprising a body and absorber terminals that are electrically connectable with said coil terminals;

wherein said surge absorber is releasably locked to at least one of said coil spool and said coil terminals by elastic engagement means integral with said surge absorber, so as to be located in a space formed by said coil terminals and said winding side portion, wherein said absorber terminals are contactable with said coil terminals to electrically connect said coil terminals and said absorber terminals;

wherein said surge absorber is provided with at least one of matching protrusions or matching recesses in positions corresponding to a coil rating and said coil spool is provided with at least one of matching recesses or matching protrusions with which said matching protrusions or matching recesses of said surge absorber match when the surge absorber is mechanically connected with the coil spool; and wherein said surge absorber is releasably locked to said at least one of said coil spool and said coil terminals such that said surge absorber is automatically removed from said magnetic coil assembly when said at least one of said coil spool and said coil terminals is removed from said magnetic coil assembly.

20. The magnetic coil assembly as defined in claim 19, wherein said matching protrusions or matching recesses of the coil spool are provided movably.

21. The magnetic coil assembly as defined in claim 20, wherein said coil spool is provided with a plurality of matching recesses or matching protrusions corresponding to a plurality of magnetic coil ratings and any of those among said plurality of matching recesses or matching protrusions that do not correspond to the rating of the coil wound around the coil spool are deleted.

* * * * *